US012631898B2

(12) United States Patent
Akimoto et al.

(10) Patent No.: US 12,631,898 B2
(45) Date of Patent: May 19, 2026

(54) IMAGE DISPLAY DEVICE

(71) Applicant: NICHIA CORPORATION, Anan (JP)

(72) Inventors: Hajime Akimoto, Anan (JP); Hiroshi Miyairi, Yokohama (JP)

(73) Assignee: NICHIA CORPORATION, Anan (JP)

( * ) Notice: Subject to any disclaimer, the term of this patent is extended or adjusted under 35 U.S.C. 154(b) by 307 days.

(21) Appl. No.: 18/493,167

(22) Filed: Oct. 24, 2023

(65) Prior Publication Data

US 2024/0142799 A1 May 2, 2024

(30) Foreign Application Priority Data

Oct. 28, 2022 (JP) ................................. 2022-173624
Dec. 20, 2022 (JP) ................................. 2022-203594

(51) Int. Cl.
*G02B 30/56* (2020.01)

(52) U.S. Cl.
CPC .................................... *G02B 30/56* (2020.01)

(58) Field of Classification Search
None
See application file for complete search history.

(56) References Cited

U.S. PATENT DOCUMENTS

| | | | |
|---|---|---|---|
| 11,892,572 B1 | 2/2024 | Dunphy et al. | |
| 12,025,798 B1 | 7/2024 | Dehkordi et al. | |
| 2010/0110384 A1 | 5/2010 | Maekawa | |
| 2011/0074657 A1 | 3/2011 | Sugiyama | |

| | | | |
|---|---|---|---|
| 2011/0235201 A1 | 9/2011 | Maekawa | |
| 2015/0279283 A1 | 10/2015 | Nakao | |
| 2018/0081058 A1 | 3/2018 | Kalscheur | |
| 2018/0101087 A1 | 4/2018 | Shinohara | |
| 2018/0164596 A1 | 6/2018 | Houzyou et al. | |
| 2018/0203244 A1 | 7/2018 | Hatanaka et al. | |
| 2018/0267216 A1 | 9/2018 | Otsubo | |
| 2019/0179160 A1* | 6/2019 | Ito ...................... G02B 26/0816 |
| 2019/0196020 A1 | 6/2019 | Aceti et al. | |
| 2020/0290513 A1 | 9/2020 | Karafin et al. | |
| 2021/0096393 A1 | 4/2021 | Daiku | |
| 2021/0103161 A1 | 4/2021 | Daiku | |
| 2021/0379993 A1 | 12/2021 | Xu et al. | |
| 2022/0043277 A1 | 2/2022 | Karafin et al. | |
| 2022/0155614 A1 | 5/2022 | Kikuta | |

(Continued)

FOREIGN PATENT DOCUMENTS

| | | | |
|---|---|---|---|
| JP | 2009-042337 A | 2/2009 | |
| JP | 2013-238681 A | 11/2013 | |

(Continued)

OTHER PUBLICATIONS

U.S. Appl. No. 18/390,715, filed Dec. 20, 2023, Akimoto et al.

(Continued)

*Primary Examiner* — Jyotsna V Dabbi
(74) *Attorney, Agent, or Firm* — Foley & Lardner LLP

(57) ABSTRACT

An image display device includes: an imaging element; a light source configured to irradiate light toward the imaging element; an optical system located in an optical path between the imaging element and the light source; a light-shielding member configured to shield a portion of light of at least the light source; and a light-transmitting member configured to transmit light emitted from the imaging element.

22 Claims, 23 Drawing Sheets

(56)　　　　References Cited

U.S. PATENT DOCUMENTS

| | | |
|---|---|---|
| 2022/0176869 A1 | 6/2022 | Maruyama |
| 2023/0035023 A1 | 2/2023 | Kikuta |
| 2023/0128022 A1 | 4/2023 | Weindorf et al. |
| 2024/0036353 A1 | 2/2024 | Krauthamer et al. |
| 2024/0184109 A1 | 6/2024 | Kitahara et al. |
| 2024/0210683 A1 | 6/2024 | Aruga et al. |
| 2024/0210684 A1 | 6/2024 | Kitahara et al. |
| 2024/0253465 A1 | 8/2024 | Shintani et al. |
| 2024/0355241 A1 | 10/2024 | Kawanishi et al. |
| 2024/0361611 A1 | 10/2024 | Daiku |
| 2024/0427169 A1 | 12/2024 | Daiku |

FOREIGN PATENT DOCUMENTS

| | | |
|---|---|---|
| JP | 2015-146009 A | 8/2015 |
| JP | 2017-156466 A | 9/2017 |
| JP | 2017-156467 A | 9/2017 |
| JP | 2017-156468 A | 9/2017 |
| WO | WO-2016/199902 A1 | 12/2016 |
| WO | WO-2017/018204 A1 | 2/2017 |
| WO | WO-2017/051598 A1 | 3/2017 |
| WO | WO-2017/146172 A1 | 8/2017 |

OTHER PUBLICATIONS

U.S. Appl. No. 18/392,314, filed Dec. 21, 2023, Hajime Akimoto.
U.S. Appl. No. 18/504,237, filed Nov. 8, 2023, Akimoto et al.
U.S. Appl. No. 18/508,974, filed Nov. 14, 2023, Akimoto et al.
U.S. Appl. No. 18/520,041, filed Nov. 27, 2023, Akimoto et al.
U.S. Appl. No. 18/526,318, filed Dec. 1, 2023, Akimoto et al.
U.S. Appl. No. 18/741,019, filed Jun. 12, 2024, Hajime Akimoto.
Notice of Allowance on U.S. Appl. No. 18/520,041 dated Apr. 9, 2025.
Non-Final Office Action in U.S. Appl. No. 18/390,715 dated May 30, 2025.
Non-Final Office Action on U.S. Appl. No. 18/504,237 dated Dec. 16, 2025.
Non-Final Office Action in U.S. Appl. No. 18/741,019 dated Apr. 8, 2026.

* cited by examiner 1320 6 I1

1320 6

IMAGE DISPLAY DEVICE

CROSS-REFERENCE TO RELATED APPLICATIONS

This application is based on and claims priority to Japanese Patent Application No. 2022-173624, filed on Oct. 28, 2022, and Japanese Application No. 2022-203594, filed on Dec. 20, 2022. The entire contents of these applications are incorporated herein by reference.

BACKGROUND

The present disclosure relates to a method for manufacturing an image display device.

A reflective imaging optical element that displays a real image of an object to be observed in mid-air and an image display device using the reflective imaging optical element have been proposed (see, e.g., Japanese Patent Publication No. 2015-146009).

Such an image display device can display an image when needed by a user, and not display the image at other times. Such an image display device does not require a device to be employed as a display part because the image is displayed in mid-air. Such an image display device therefore has advantages such as more effective utilization of the limited space inside an automobile or the like.

Further, a non-contact operation panel can be realized by applying such an image display device. Therefore, there are expectations for expanding the field of application beyond the utilization in automobiles and the like.

Reflective imaging optical elements that can display images in mid-air, such as those that use dihedral corner reflectors or retroreflective function optical elements called corner cube reflectors, have been put into practical use (see, e.g., PCT Publication No. WO2016/199902). Attention has been called to problems resulting from the operation principles of these devices. For example, in an image display device using imaging elements having dihedral corner reflectors, it is said to be difficult to avoid the display of virtual images at locations unintended by the user.

In an image display device using a corner cube reflector, the image formation position can be set relatively freely by using an optical element in addition to a light source and imaging element. On the other hand, the configuration of such an optical element is complex.

There is a demand for an image display device having a simple structure that can display an image in mid-air.

SUMMARY

According to certain embodiments of the invention, an image display device can be provided having a simple structure that can display an image in mid-air.

An image display device according to one embodiment of the invention includes an imaging element; a light source configured to irradiate light toward the imaging element; an optical system located in an optical path between the imaging element and the light source; a light-shielding member configured to shield a portion of light of at least the light source; and a light-transmitting member configured to transmit light emitted from the imaging element. The imaging element includes a base member and a reflector array provided on the base member, the base member including a first surface and a second surface positioned at a side opposite to the first surface, or a base member including a reflector array, the base member including a first surface and a second surface positioned at a side opposite to the first surface. The reflector array includes a plurality of reflector rows, the plurality of reflector rows including a plurality of dihedral corner reflectors arranged along a first direction. Each of the plurality of dihedral corner reflectors includes a first reflecting surface configured to reflect light from the first surface side, and a second reflecting surface oriented to be orthogonal to the first reflecting surface and configured to reflect a reflected light from the first reflecting surface toward the first surface side. In each reflector row of the plurality of reflector rows, an angle between a straight line at which the first reflecting surface and the second reflecting surface meet and a plane in which the first direction and a second direction intersecting the first direction extend is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in the second direction. The light source is provided at the first surface side. Each of the plurality of dihedral corner reflectors is configured to cause a portion of once-reflected light to travel toward the second reflecting surface, the once-reflected light being light that is emitted from the light source and reflected at the first reflecting surface. The light-transmitting member is configured to transmit a twice-reflected light, the twice-reflected light being a portion of the once-reflected light that is reflected at the second reflecting surface. The light-shielding member is configured to shield at least a portion of light other than the twice-reflected light.

An image display device according to one embodiment of the invention includes an imaging element; a light source irradiating light toward the imaging element; an optical system located in an optical path between the imaging element and the light source; a light-shielding member configured to shield a portion of light of at least the light source; and a light-transmitting member configured to transmit light emitted from the imaging element. The imaging element includes a base member, and a reflector array provided on the base member, the base member including a first surface and a second surface positioned at a side opposite to the first surface, or a base member comprising a reflector array provided in a base member, the base member including a first surface and a second surface positioned at a side opposite to the first surface. The reflector array includes a plurality of reflector rows, the plurality of reflector rows including a plurality of dihedral corner reflectors arranged along a first direction. The plurality of reflector rows are arranged in a second direction to be parallel to each other with a spacing therebetween, the second direction intersecting the first direction. Each of the plurality of dihedral corner reflectors includes a first reflecting surface configured to reflect light from the first surface side, and a second reflecting surface orthogonal to the first reflecting surface and configured to reflect a reflected light reflected from the first reflecting surface toward the first surface side. In each reflector row of the plurality of reflector rows, an angle between a straight line at which the first reflecting surface and the second reflecting surface meet and a plane in which the first direction and the second direction intersect is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in one direction along the second direction. The light source is provided at the first surface side. Each of the plurality of dihedral corner reflectors is configured such that a portion of a reflected light travels toward the second reflecting surface, and another portion of the reflected light travels toward the second surface side, the reflected light being light that is emitted from the light source and reflected once at the first reflecting surface. The light-transmitting member is configured to transmit twice-reflected light, the twice-reflected light being a portion of the reflected light, the portion being reflected at the second reflecting surface. The light-shielding member configured to shield at least a portion of light other than the twice-reflected light.

DETAILED DESCRIPTION

Figure 1:
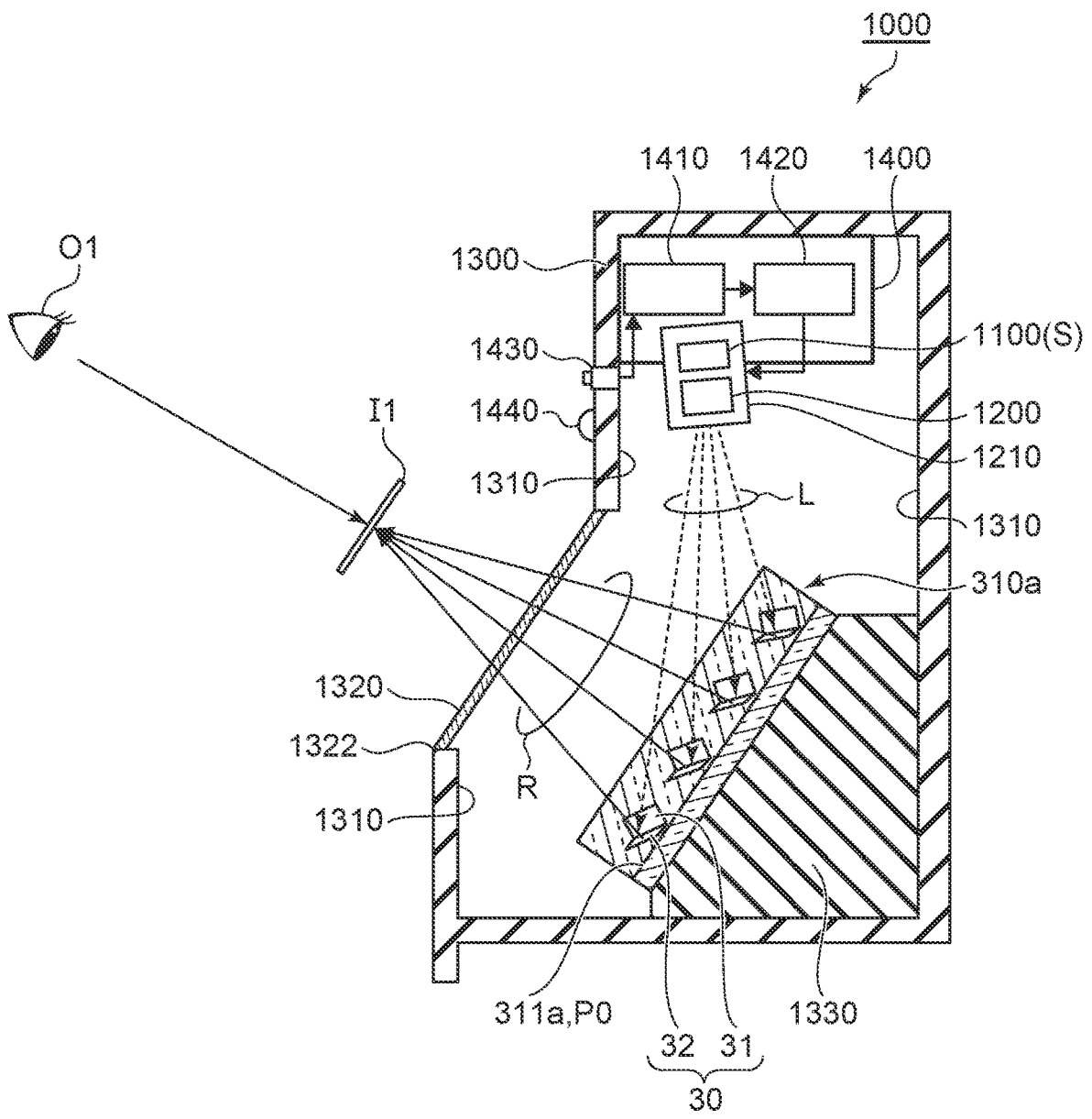
FIG. 1 is a schematic cross-sectional view illustrating an image display device according to a first embodiment.

Exemplary embodiments will now be described with reference to the drawings.

The drawings are schematic or conceptual, and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a previous drawing are denoted with the same reference numerals, and a detailed description is omitted as appropriate.

First Embodiment

FIG. 1 is a schematic cross-sectional view illustrating an image display device according to a first embodiment.

As shown in FIG. 1, the image display device 1000 according to the present embodiment includes an imaging element 310a, a display device 1100(S), an optical system 1200, a housing 1300, and a light-transmitting member 1320. The image display device 1000 is configured such that light L emitted from the display device 1100(S) via the optical system 1200 is reflected by the imaging element 310$a$, and that a reflected light R from the imaging element 310$a$ passes through the light-transmitting member 1320 to form an image in mid-air outside the housing 1300. The display device 1100(S) can output an image made of a collection of the lights L, so that an observer O1 can observe the image output from the display device 1100(S) as an image I1 formed outside the housing 1300.

The housing 1300 is provided around the display device 1100(S), the optical system 1200, and the imaging element 310$a$. That is, the display device 1100(S), the optical system 1200, and the imaging element 310$a$ are located inside the housing 1300. In the example, the display device 1100(S) and the optical system 1200 are located at an upper portion inside the housing 1300, and the imaging element 310$a$ is located at a lower portion inside the housing 1300.

In the example, the display device 1100(S) and the optical system 1200 are included in one display module 1210. In the display module 1210, the display device 1100(S) is located at an upper side, and the optical system 1200 is located below the display device 1100(S). The display device 1100 (S) emits light downward toward the optical system 1200, and the light from above the optical system 1200 is transmitted through the optical system 1200 and exits downward.

In the example, the light L that is incident from the optical system 1200 is emitted obliquely upward by the imaging element 310$a$ as the reflected light R. Therefore, the reflected light R is emitted in a direction perpendicular to a plane P0 to be described below. The imaging element 310$a$ is located at an imaging element mounting part 1330 and, for example, fixed to the imaging element mounting part 1330, which is provided to support the plane P0 in the direction in which the reflected light R is emitted.

The housing 1300 has any appropriate exterior shape. The housing 1300 houses the display device 1100(S), the optical system 1200, and the imaging element 310$a$ inside the housing 1300. In the example, a control device 1400 and the imaging element mounting part 1330 also are located inside the housing 1300.

A light-shielding member 1310 is a portion of the housing 1300. In the example, the light-shielding member 1310 is a light-absorbing layer located at the inner wall of the housing 1300. The light-absorbing layer is, for example, a coating layer of a black coating. By providing the light-shielding member 1310 at the inner wall of the housing 1300 in the image display device 1000, a portion of the light emitted from the display device 1100(S), the optical system 1200, and the imaging element 310$a$ is prevented from being reflected inside the housing 1300 and thus becoming stray light. The light-shielding member 1310 is a coating layer of a coating material and is sufficiently thin compared to the thickness of the component of the housing 1300, and is therefore illustrated as a surface of the inner wall of the housing 1300 in FIG. 1.

The light-transmitting member 1320 is provided in a portion of the housing 1300. The light-transmitting member 1320 is located at the position of a window frame 1322 formed in a portion of the housing 1300. The window frame 1322 is an opening at a position facing the imaging element 310$a$.

More specifically, as described below with reference to FIGS. 6 to 15, the imaging element 310$a$ includes a plurality of dihedral corner reflectors 30 arranged in a matrix configuration on a first surface 311$a$. The first surface 311$a$ is provided to be substantially parallel to the light-transmitting member 1320 and the opening of the window frame 1322. Each dihedral corner reflector 30 includes a first reflecting surface 31 and a second reflecting surface 32. Each of the first reflecting surface 31 and the second reflecting surface 32 reflects light once, so that twice-reflected light from the dihedral corner reflector 30 is emitted as the reflected light R. The light-transmitting member 1320 and the window frame 1322 are provided to transmit the twice-reflected light from the imaging element 310$a$.

In the example, the display module 1210 and the imaging element 310$a$ are arranged to form the image I1 directly above the imaging element 310$a$. "Directly above the imaging element 310$a$" refers to a position in a direction normal to the first surface 311$a$. In such an arrangement, there may be cases where a portion of the once-reflected light exits the imaging element 310$a$ toward the first surface 311$a$ side and forms virtual images and/or ghosts. Further, depending on the configuration of the imaging element 310$a$, there may also be cases where light that is not reflected by any reflecting surface is emitted toward the first surface side. Accordingly, it is necessary to provide the light-shielding member 1310 at the inner wall of the housing 1300 at positions that shield at least the light leaking from the display module 1210 and the light other than the twice-reflected light from the imaging element 310$a$.

The reflected light R that is emitted from the imaging element 310$a$ passes through the light-transmitting member 1320 and forms the image I1 outside the housing 1300. That is, the light-transmitting member 1320 is located between the imaging element 310$a$ and the position at which the image I1 is formed. When the observer O1 is present, the image I1 is formed between the observer O1 and the light-transmitting member 1320.

As in the present example, the image display device 1000 may include the control device 1400, a camera 1430, camera lighting 1440, etc. The display module 1210 is supported by the control device 1400. The angle of the optical axis of the display module 1210 and the distance between the display module 1210 and the imaging element 310$a$ can be modified by the control device 1400.

The control device 1400 includes a controlling unit 1410 and a driving unit 1420. The controlling unit 1410 performs image analysis of image data including the observer O1 acquired by the camera 1430, calculates information of the position of the observer O1, forms the image I1 according to the position of the observer O1, and calculates information of a more appropriate position. Based on the information of the position of the image I1 calculated by the controlling unit 1410, the driving unit 1420 modifies the angle of the optical axis of the display module 1210 and/or the position of the display module 1210 to set the direction of the light emitted from the display module 1210.

The information of the position of the observer O1 calculated by the controlling unit 1410 is, for example, the position of the face of the observer O1, the positions of eyes of the observer O1, etc. The camera lighting 1440 makes it possible to acquire clear image data including the observer O1 by irradiating illumination light on the observer O1 when imaging the image data.

Configurations of the display device 1100(S) and the optical system 1200 will now be described.

Figure 2:
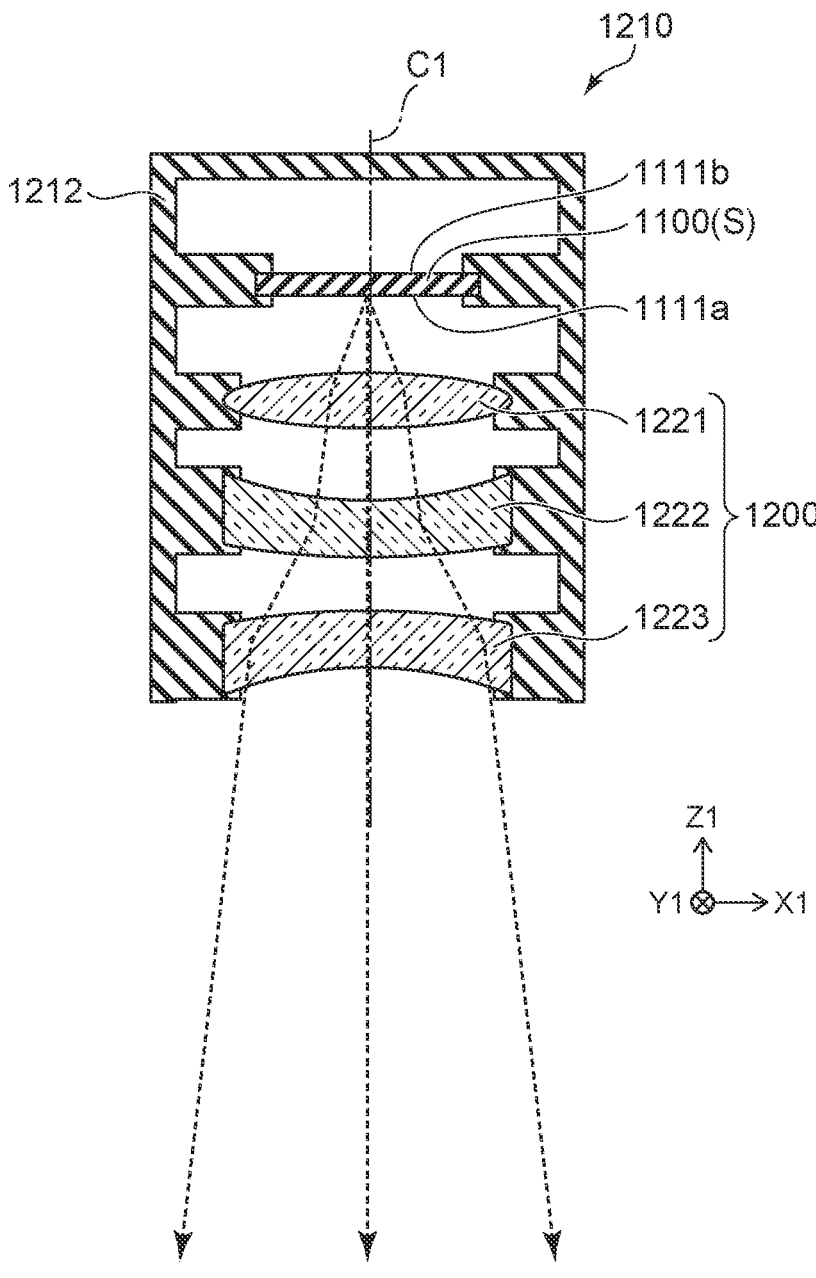
FIG. 2 is a schematic cross-sectional view illustrating a portion, i.e., a display device and an optical system, of the image display device according to the first embodiment.

FIG. 2 is a schematic cross-sectional view illustrating a portion, i.e., a display device and an optical system, of the image display device according to the first embodiment.

As shown in FIG. 2, the display module 1210 includes the display device 1100(S) and the optical system 1200. The display module 1210 includes, for example, a cylindrical module housing 1212. The display device 1100(S) and the optical system 1200 are supported respectively by supporting portions inside the module housing 1212. LED elements located at a first surface 1111$a$ of the display device 1100(S), etc., are not illustrated in FIG. 2 to avoid complexity.

A three-dimensional orthogonal coordinate system may be used in the description of the display device 1100(S). The three-dimensional orthogonal coordinate system for the description of the display device 1100(S) is an orthogonal coordinate system including an X1-axis, a Y1-axis, and a Z1-axis. A direction parallel to the X1-axis may be referred to as an "X1-direction," a direction parallel to the Y1-axis may be referred to as a "Y1-direction," and a direction parallel to the Z1-axis may be referred to as a "Z1-direction," The X1Y1-plane that includes the X1-axis and the Y1-axis is parallel to the first surface 1111$a$ of the substrate of the display device 1100(S). The first surface 1111$a$ is a surface at which the LED elements are disposed. The X1-axis is parallel to the rows of pixels of the display device 1100(S). The Y1-axis is orthogonal to the X1-axis. The Z1-axis is orthogonal to the X1-axis and the Y1-axis and is the positive direction from the first surface 1111$a$ toward a second surface 1111$b$. The second surface 1111$b$ is positioned at a side of a substrate 1110 opposite to the first surface 1111$a$. A detailed configuration of the display device 1100(S) will be described below.

According to the X1Y1Z1-orthogonal coordinate system, the display device 1100(S) emits light mainly in the negative direction of the Z1-axis. The optical system 1200 is located at the side at which the display device 1100(S) emits light. That is, the optical system 1200 is located at the negative Z1-axis side of the display device 1100(S).

The optical system 1200 can include one or more optical lenses. In the present example, the optical system 1200 includes three optical lenses 1221 to 1223. The three optical lenses 1221, 1222, and 1223 are aligned in this order in the negative direction of the Z1-axis. The optical lenses 1221 to 1223 are arranged along the same optical axis C1. In the present example, two opposite surfaces of the optical lens 1221 are convex, and each of the optical lenses 1222 and 1223 has one concave surface. The types, positions, and arrangement order of the optical lenses are appropriately set according to the optical design and are not limited to the specific example shown in FIG. 2. Although the optical system 1200 includes a plurality of optical lenses in the example of FIG. 2, the optical system 1200 may be constituted of one optical lens. The display device 1100(S) and the optical system 1200 are not limited to be in one display module; the display device 1100(S) and the optical system 1200 may be provided separately inside the housing 1300.

The configuration of the display device 1100(S) will now be described in more detail.

Figure 3A:
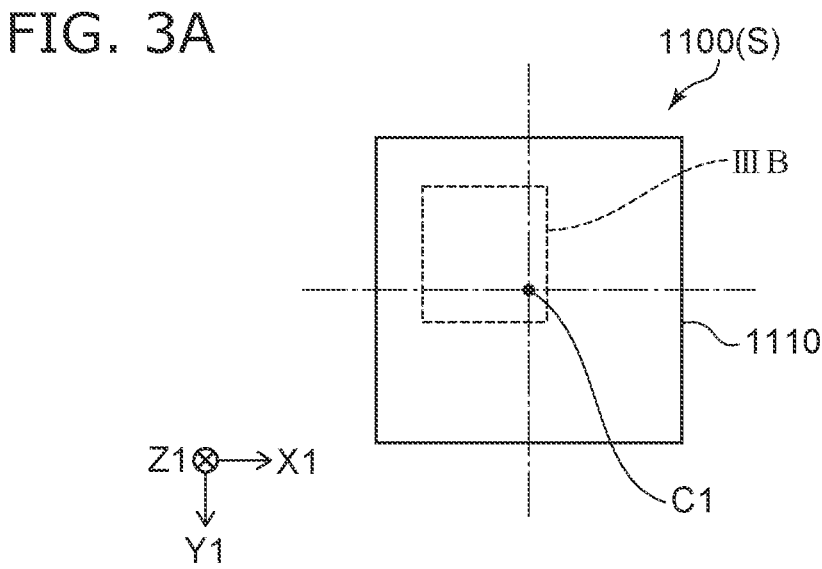
FIG. 3A is a schematic plan view illustrating a portion, i.e., the display device, of the image display device according to the first embodiment.

FIG. 3A is a schematic plan view illustrating a portion, i.e., the display device, of the image display device according to the first embodiment.

Figure 3B:
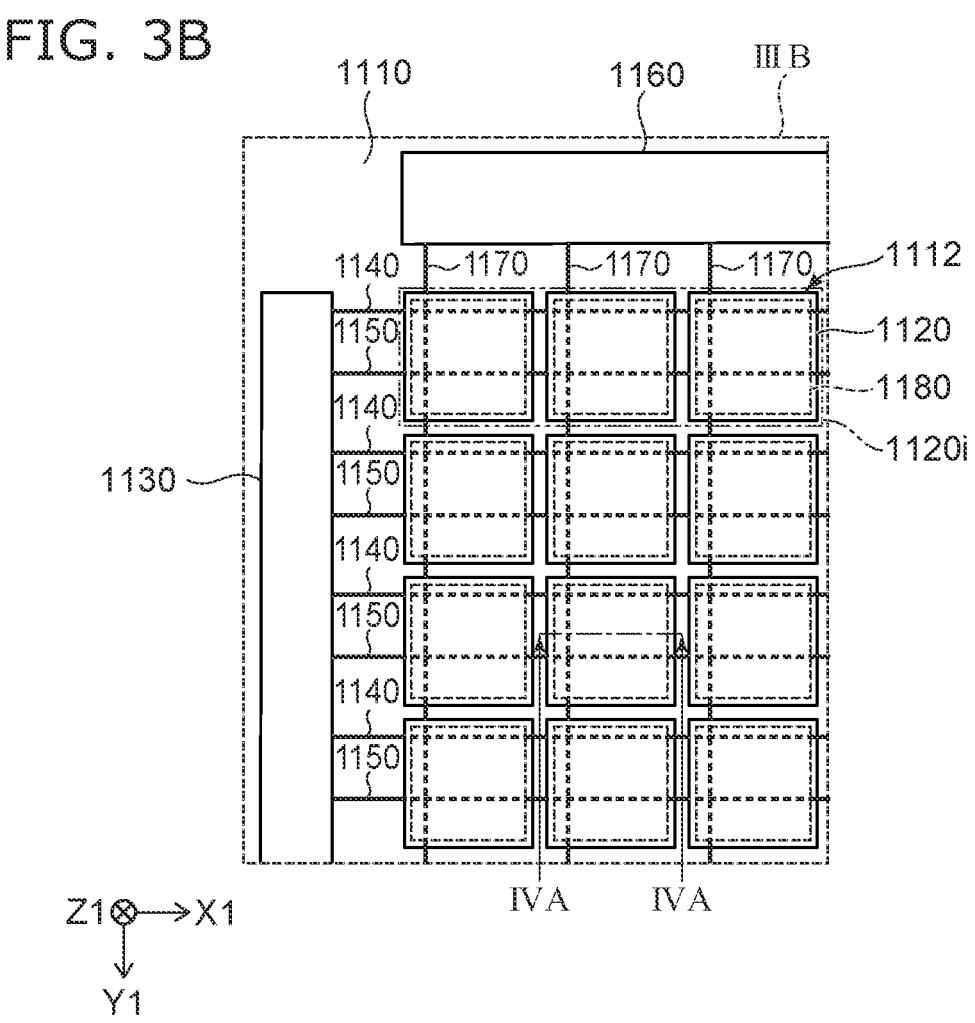
FIG. 3B is an enlarged schematic view of portion IIIB of FIG. 3A.

FIG. 3B is an enlarged schematic view of portion IIIB of FIG. 3A.

Figure 4A:
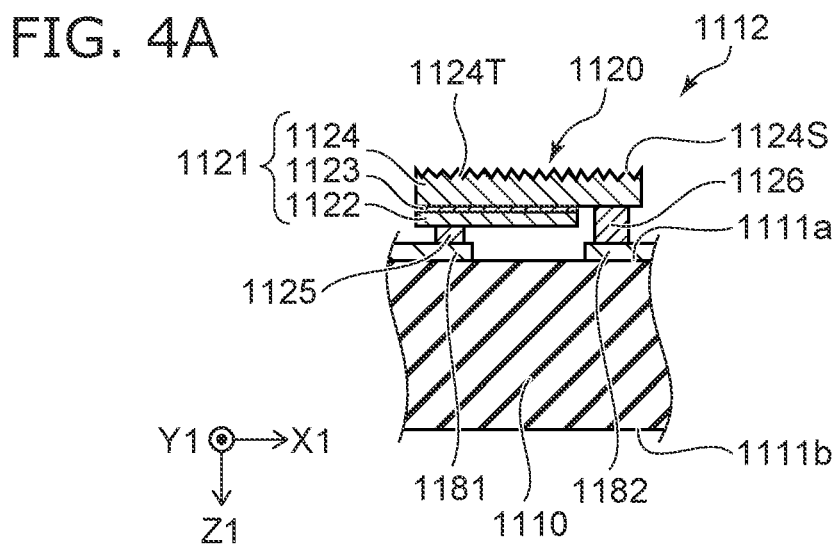
FIG. 4A is a schematic auxiliary cross-sectional view along line IVA-IVA of FIG. 3B.

FIG. 4A is a schematic auxiliary cross-sectional view along line IVA-IVA of FIG. 3B.

As shown in FIG. 3A, the display device 1100(S) includes the substrate 1110 that is rectangular when viewed in the X1Y1-plane. For the substrate 1110, for example, glass, a resin such as polyimide or the like, or a Si substrate may be used. The display device 1100(S) has the optical axis C1 in a direction normal to a surface of the substrate 1110.

As shown in FIG. 3B, the display device 1100(S) includes a plurality of pixels 1112 as a light source. The display device 1100(S) uses the plurality of pixels 1112 to display the desired image. The display device 1100(S) is electrically connected to a controller not illustrated in the drawing. The controller is provided inside the housing 1300 and/or outside the housing 1300 and supplies data related to the image displayed by the display device 1100(S). The display device 1100(S) displays a still image, a video image, etc., based on the data related to the image supplied from the controller.

The display device 1100(S) includes the substrate 1110, the plurality of pixels 1112, a scanning circuit 1130, a plurality of scanning lines 1140, a plurality of lighting control lines 1150, a drive circuit 1160, and a plurality of signal lines 1170. The pixel 1112 includes LED elements 1120 and individual circuits 1180. The LED elements 1120, the scanning circuit 1130, the drive circuit 1160, and the individual circuits 1180 are shown simply as quadrilaterals to avoid complexity in the illustration of FIG. 3B.

The plurality of LED elements 1120 are arranged in a matrix configuration. Hereinbelow, the plurality of LED elements 1120 arranged in one row in the X1-direction are called the "row 1120*i*."

As shown in FIG. 4A, the substrate 1110 includes the first surface 1111$a$ and the second surface 1111$b$. The second surface 1111$b$ is at a side opposite to the first surface 1111$a$. The LED elements 1120 are arranged in a matrix configuration on the first surface 1111$a$. The LED elements 1120 are face-down mounted on the first surface 1111$a$. The LED elements are not limited to be mounted in a face-down manner but may be mounted in a face-up manner on the first surface 1111$a$.

The LED element 1120 includes a semiconductor stacked body 1121, an anode electrode 1125, and a cathode electrode 1126. The semiconductor stacked body 1121 includes a p-type semiconductor layer 1122, an active layer 1123 located on the p-type semiconductor layer 1122, and an n-type semiconductor layer 1124 located on the active layer 1123. The semiconductor stacked body 1121 includes, for example, a gallium nitride compound semiconductor of $In_XAl_YGa_{1-X-Y}N$ ($0{\leq}X$, $0{\leq}Y$, and $X+Y<1$). In the present embodiment, the light that is emitted by the LED element 1120 is visible light.

The anode electrode 1125 is electrically connected to the p-type semiconductor layer 1122. The anode electrode 1125 also is electrically connected to a wiring part 1181 of the individual circuit 1180 described below with reference to FIG. 5. The cathode electrode 1126 is electrically connected to the n-type semiconductor layer 1124. The cathode electrode 1126 also is electrically connected to another wiring part 1182 of the individual circuit 1180. For the anode electrode 1125 and the cathode electrode 1126, for example, a metal material may be used.

In the example, a plurality of recesses 1124T are formed in a light-emitting surface 1124S of the LED element 1120. Hereinbelow, the term "light-emitting surface of the LED element" means a surface of the LED element from which the light is mainly emitted. The light that is emitted from the light-emitting surface 1124S is incident on the optical system 1200. In the present example, the light-emitting surface 1124S is one surface of the n-type semiconductor layer 1124. More specifically, the light-emitting surface 1124S is a surface of the n-type semiconductor layer 1124 opposite to its surface facing the active layer 1123.

Methods of forming the plurality of recesses 1124T in the light-emitting surface 1124S include a method in which an n-type semiconductor layer is grown on a growth substrate in which protrusions are formed, a method in which surface roughening of the surface of the n-type semiconductor layer is performed by anisotropic etching, etc.

Thus, with the plurality of recesses 1124T formed in the light-emitting surface 1124S of the LED element 1120, the LED element 1120 can emit light having a larger light distribution angle.

The configuration of the LED element is not limited to the configuration described above. For example, a plurality of protrusions instead of the plurality of recesses may be formed in the light-emitting surface of the LED element, or both a plurality of recesses and a plurality of protrusions may be formed. When the growth substrate is light-transmissive, the LED element may have a configuration in which the growth substrate is not detached from the semiconductor stacked body, and a plurality of recesses and/or a plurality of protrusions may be formed in a surface of the growth substrate corresponding to the light-emitting surface.

The structure of the display device 1100(S) is not limited to the structure described above. Although the LED elements 1120 are individually mounted on the substrate 1110 in which the individual circuits 1180 are provided in the example above, the LED elements 1120 may be individually processed from a semiconductor stacked body bonded on the substrate 1110 in which the individual circuits 1180 are provided, and then wired.

Figure 4B:
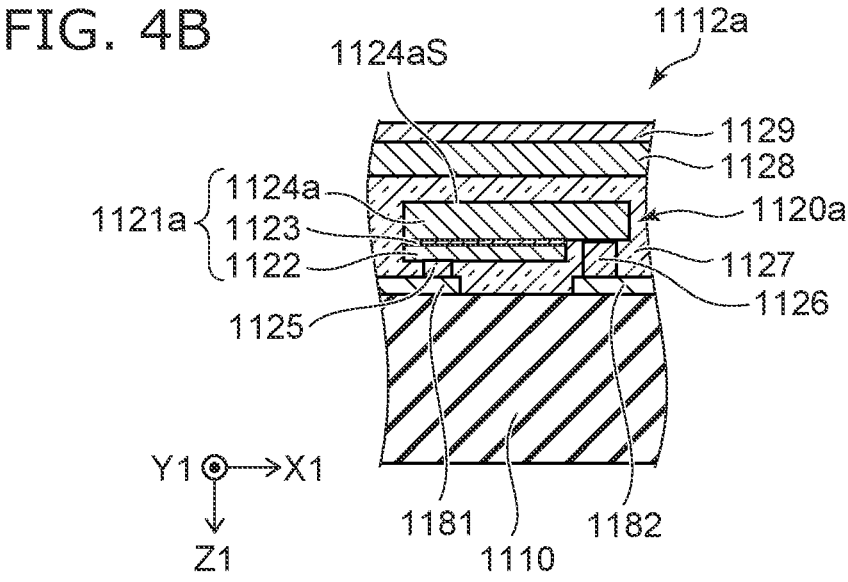
FIG. 4B is a schematic cross-sectional view illustrating a portion, i.e., a modification of the display device, of the image display device according to the first embodiment.

FIG. 4B is a schematic cross-sectional view illustrating a portion, i.e., a modification of the display device, of the image display device according to the first embodiment.

FIG. 4B corresponds to an auxiliary cross-sectional view along line IVA-IVA of FIG. 3B, and is an auxiliary cross-sectional view at the same position as the position shown in FIG. 4A.

As shown in FIG. 4B, a pixel 1112a includes an LED element 1120a and a wavelength conversion member 1128. Similarly to the pixel 1112 shown in FIG. 3B, the pixel 1112a includes the individual circuit 1180. As in the example, the pixel 1112a may further include a color filter 1129.

According to the modification, the LED element 1120a includes a semiconductor stacked body 1121a, the anode electrode 1125, and the cathode electrode 1126. The semiconductor stacked body 1121a includes the p-type semiconductor layer 1122, the active layer 1123, and an n-type semiconductor layer 1124a. The active layer 1123 is located on the p-type semiconductor layer 1122, and the n-type semiconductor layer 1124a is located on the active layer 1123. The n-type semiconductor layer 1124a includes a light-emitting surface 1124aS. The light-emitting surface 1124aS is a flat surface that does not include recesses or protrusions.

In the pixel 1112a, a protective layer 1127 covers the LED element 1120a, the wiring parts 1181 and 1182, and the first surface 1111a of the substrate 1110. For example, a light-transmitting material such as a polymer material containing a sulfur (S)-including substituent group or phosphorus (P) atom-including group, a high refractive index nanocomposite material in which high refractive index inorganic nanoparticles are introduced to a polymer matrix of polyimide, etc., can be used for the protective layer 1127.

The wavelength conversion member 1128 is located on the protective layer 1127. The wavelength conversion member 1128 includes at least one type of wavelength conversion material such as a general fluorescent material, a perovskite fluorescent material, a quantum dot (QD), etc. The light that is emitted from the LED element 1120a is incident on the wavelength conversion member 1128. The wavelength conversion material that is contained in the wavelength conversion member 1128 converts light emitted from the LED element 1120a into light of a different peak wavelength, and emits the wavelength-converted light. The light that is incident on the wavelength conversion member 1128 is scattered inside the wavelength conversion member 1128; therefore, the light that is emitted by the wavelength conversion member 1128 has a wider light distribution angle.

The color filter 1129 is located on the wavelength conversion member 1128. The color filter 1129 can shield a large part of the light emitted from the LED element 1120a. Accordingly, a main portion of light emitted from the pixel 1112a is the light emitted by the wavelength conversion member 1128.

In the present modification, the light emission peak wavelength of the LED element 1120a may be in the ultraviolet region or the visible light region. When blue light is to be emitted from at least one pixel 1112a, blue light may be emitted from the LED element 1120a belonging to the pixel 1112a without providing the wavelength conversion member 1128 and the color filter 1129 in the pixel 1112a.

In the LED element, an n-type semiconductor layer may be provided to face a substrate, an active layer and a p-type semiconductor layer may be stacked in this order on the n-type semiconductor layer, and a surface of the p-type semiconductor layer at the side opposite to its surface facing the active layer may be used as the light-emitting surface of the LED element.

As shown in FIG. 3B, for example, the scanning circuit 1130 is provided at the substrate 1110 to be adjacent to the plurality of LED elements 1120, which are arranged in a matrix configuration, in the X1-direction in a pl view.

The scanning circuit 1130 is configured to sequentially switch, in the Y1-direction, the row 1120i that is driven. The plurality of scanning lines 1140 extend in the X1-direction from the scanning circuit 1130. The plurality of lighting control lines 1150 extend in the X1-direction from the scanning circuit 1130. The plurality of scanning lines 1140 and the plurality of lighting control lines 1150 are alternately arranged in the Y1-direction.

The drive circuit 1160 is provided at the substrate 1110 to be adjacent to the plurality of LED elements 1120, which are arranged in the matrix configuration, in the Y1-direction when viewed in the X1Y1-plane. The drive circuit 1160 is configured to control the outputs of the LED elements 1120 belonging to the row 1120i that is driven. The plurality of signal lines 1170 extend in the Y1-direction from the drive circuit 1160. The plurality of signal lines 1170 are arranged in the X1-direction. The drive circuit 1160 may include an IC chip, and the IC chip may be mounted on the substrate 1110.

For example, the scanning circuit 1130, the plurality of scanning lines 1140, the plurality of lighting control lines 1150, the drive circuit 1160, the plurality of signal lines 1170, and the individual circuits 1180 are formed on the substrate 1110 by a low-temperature polysilicon (LTPS) process.

In the example, a single pixel 1112 includes a single individual circuit 1180 and a single LED element 1120. A plurality of LED elements 1120 may be included in a single pixel 1112. When a plurality of LED elements 1120 are included in a single pixel 1112, a single individual circuit may correspond to a plurality of LED elements. Alternatively, the individual circuit 1180 may be provided for each LED element 1120 in a single pixel 1112.

Figure 5:
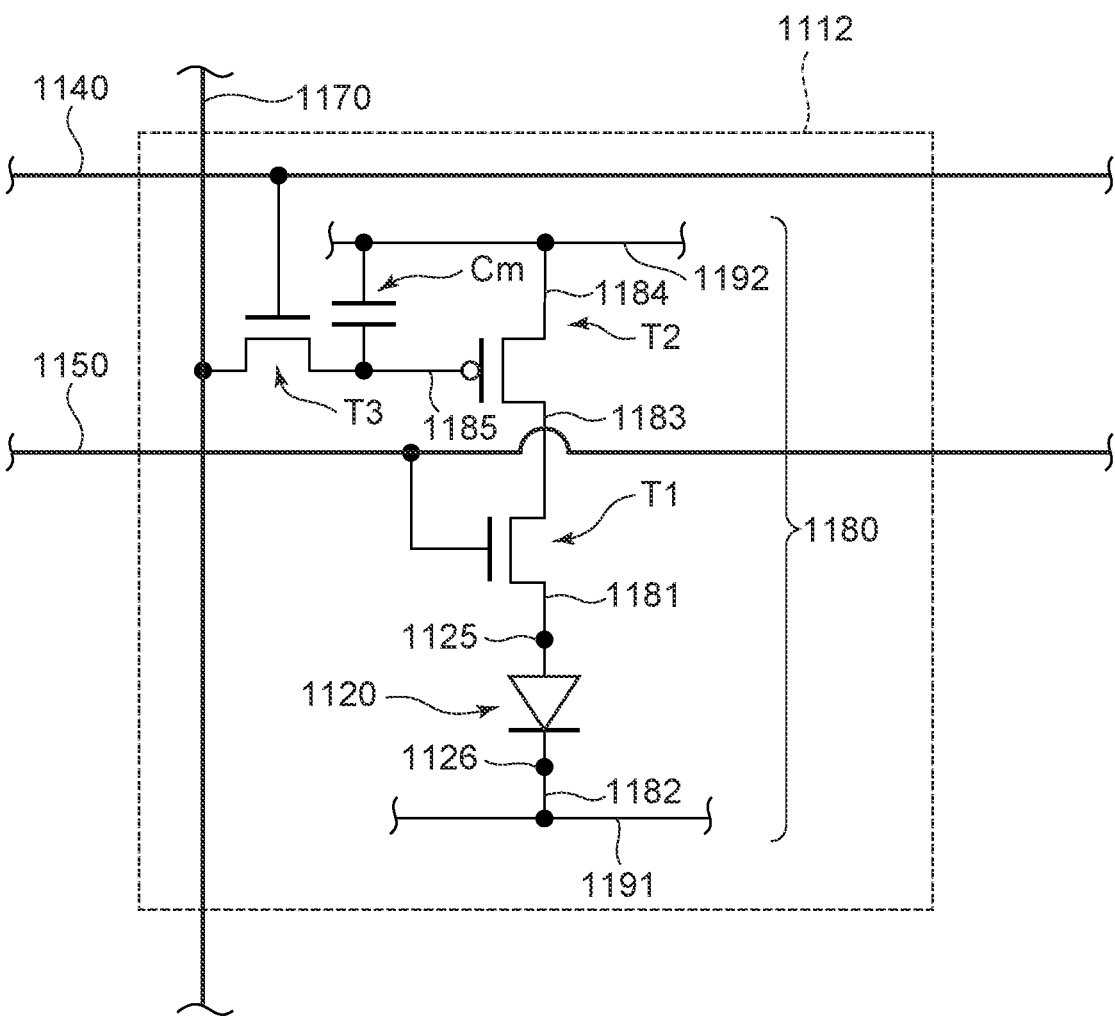
FIG. 5 is a schematic equivalent circuit diagram illustrating a portion, i.e., the display device, of the image display device according to the first embodiment.

FIG. 5 is a schematic equivalent circuit diagram illustrating a portion, i.e., the display device, of the image display device according to the first embodiment.

As shown in FIG. 5, the individual circuit 1180 includes a first transistor T1, a second transistor T2, a third transistor T3, a capacitor Cm, and a plurality of wiring parts 1181 to 1185. The first transistor T1 and the third transistor T3 are n-channel MOSFETs. The second transistor T2 is a p-channel MOSFET.

The cathode electrode 1126 of the LED element 1120 is electrically connected to a ground line 1191 via the wiring part 1182. For example, a voltage that is used as a reference is applied to the ground line 1191. The anode electrode 1125 of the LED element 1120 is electrically connected to the source electrode of the first transistor T1 via the wiring part 1181.

The gate electrode of the first transistor T1 is electrically connected to the lighting control line 1150. The drain electrode of the first transistor T1 is electrically connected to the drain electrode of the second transistor T2 via a wiring part 1183. The source electrode of the second transistor T2 is electrically connected to a power supply line 1192 via a wiring part 1184. A sufficiently higher voltage than the voltage used as the reference is applied to the power supply line 1192. Although not illustrated, a DC power supply is connected to the power supply line 1192 and the ground line 1191, and a positive DC voltage with respect to the reference voltage applied to the ground line 1191 is applied between the power supply line 1192 and the ground line 1191.

The gate electrode of the second transistor T2 is electrically connected to the drain electrode of the third transistor T3 via the wiring part 1185. The source electrode of the third transistor T3 is electrically connected to the signal line 1170. The gate electrode of the third transistor T3 is electrically connected to the scanning line 1140.

The wiring part 1185 is electrically connected to one terminal of the capacitor Cm. The other terminal of the capacitor Cm is electrically connected to the power supply line 1192.

The scanning circuit 1130 selects one row 1120$i$ among the plurality of rows and outputs an on-signal to the scanning line 1140 electrically connected to the row 1120$i$. Accordingly, the third transistors T3 of the individual circuits 1180 corresponding to the row 1120$i$ are in a state in which the third transistors T3 can be switched on. The drive circuit 1160 outputs, to the signal lines 1170, drive signals including drive signal voltages corresponding to the set outputs of the LED elements 1120 belonging to the row 1120$i$. Accordingly, the drive signal voltages are stored in the capacitors Cm. The drive signal voltages set the second transistors T2 of the individual circuits 1180 corresponding to the row 1120$i$ to a state in which the second transistors T2 can be switched on.

The scanning circuit 1130 outputs, to the lighting control line 1150 electrically connected to the row 1120$i$, a control signal that sequentially switches the first transistors T1 of the row 1120$i$ on and off. When the first transistors T1 are in the on-state, the light emission luminances of the LED elements 1120 are controlled by currents corresponding to the drive signal voltages stored in the capacitors Cm flowing in the LED elements 1120 belonging to the row 1120$i$. The light emission periods of the LED elements 1120 are controlled for each row 1120$i$ by switching the first transistors T1 on and off.

The scanning circuit 1130 sequentially switches, in the Y1-direction, the scanning line 1140 to which the on-signal is output and the lighting control line 1150 to which the control signal is output. Accordingly, the row 1120$i$ that is driven is sequentially switched in the Y1-direction.

The configurations of the scanning circuit, the plurality of scanning lines, the plurality of lighting control lines, the drive circuit, the plurality of signal lines, the plurality of individual circuits, etc., are not limited to those described above. For example, the individual circuit may be made of a second transistor, a third transistor, a capacitor, and wiring parts without including a first transistor, a plurality of scanning lines may extend from the scanning circuit, and a lighting control line may be omitted. The scanning lines, the lighting control lines, the signal lines, and the wiring parts and the like of the individual circuits may be provided inside the substrate instead of being provided on the surface of the substrate, and may. The electrical elements such as the transistors, capacitors, and the like included in the drive circuit may be separately manufactured and then mounted on the substrate instead of being formed on the substrate. Instead of separately manufacturing the LED elements and then mounting to the substrate, the LED elements may be formed on the substrate by using a semiconductor material such as Si or the like as the substrate. In such a case, each transistor element may be a silicon semiconductor element provided on the silicon substrate 1110 instead of a low-temperature polysilicon element provided on the glass substrate 1110.

While the display device that includes the LED element as described above is favorable in that a sufficient light emission luminance is realized with low power consumption, the display device is not limited thereto. Instead of an LED display using an LED element such as that described above, the display device may be an OLED display, a liquid crystal display, etc.

A configuration of the imaging element 310$a$ will now be described in detail.

Figure 6:
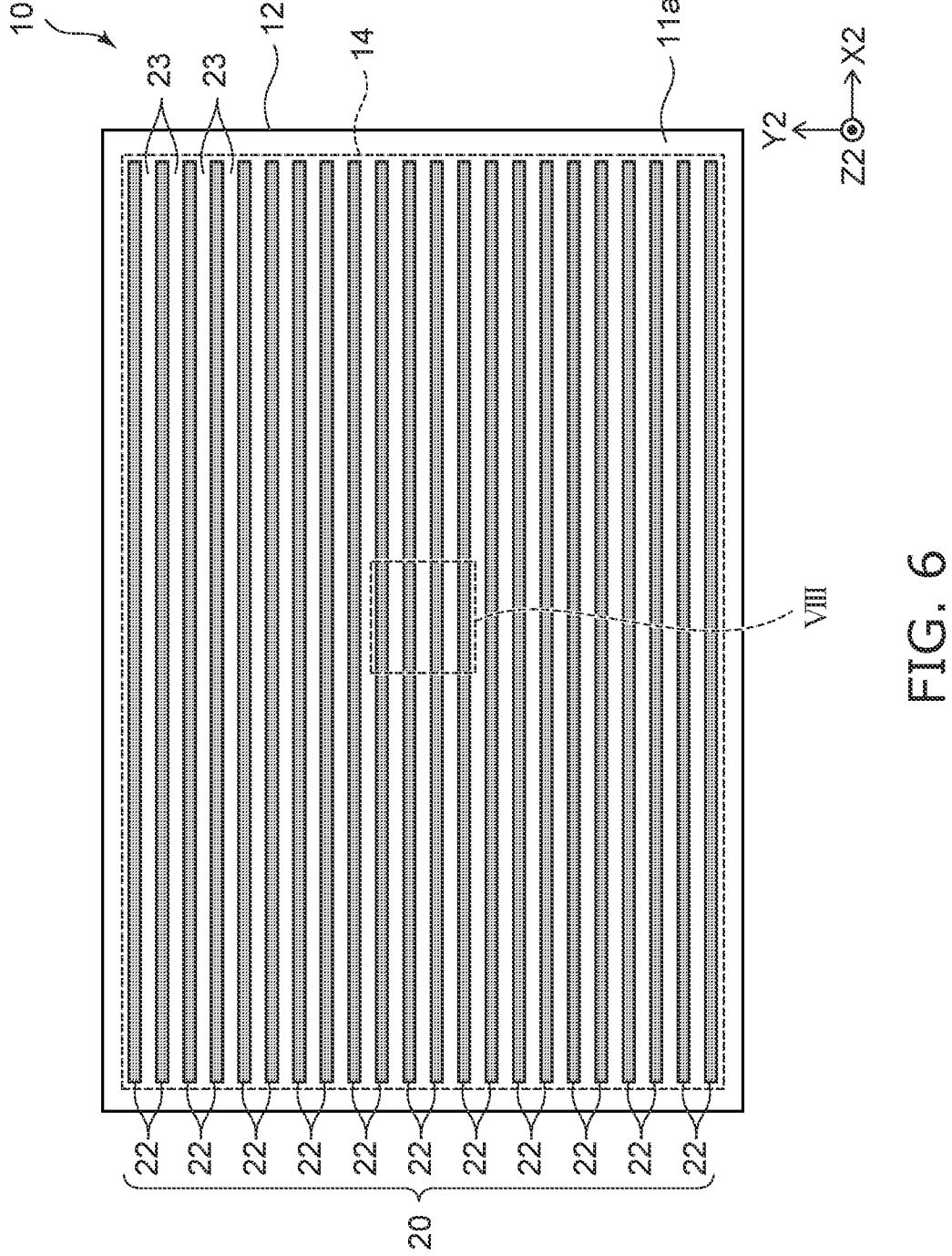
FIG. 6 is a schematic plan view illustrating a portion, i.e., an imaging element, of the image display device.

FIG. 6 is a schematic plan view illustrating a portion, i.e., an imaging element, of the image display device.

As shown in FIG. 1, the image display device 1000 according to the present embodiment includes the imaging element 310$a$. The imaging element 310$a$ shown in FIG. 1 is one of many variations of imaging element configurations. The following description includes the function principle of the imaging element forming the image in mid-air. First, the configuration and function of the imaging element 10 will be described.

As shown in FIG. 6, the imaging element 10 includes a base member 12 and a reflector array 20. The base member 12 includes a first surface 11$a$, and the reflector array 20 is provided on the first surface 11$a$. In the example, the reflector array 20 is provided inside a reflector formation region 14 of the first surface 11$a$. The reflector array 20 includes a plurality of reflector rows 22. The reflector array 20 may be provided in the base member 12. That is, the reflector array 20 and the base member 12 may be formed as a single continuous body. In such a case, the first surface 11$a$ of the base member 12 is the dihedral corner reflectors of the reflector array 20 described below.

A configuration of the base member 12 will now be described.

Figure 7:
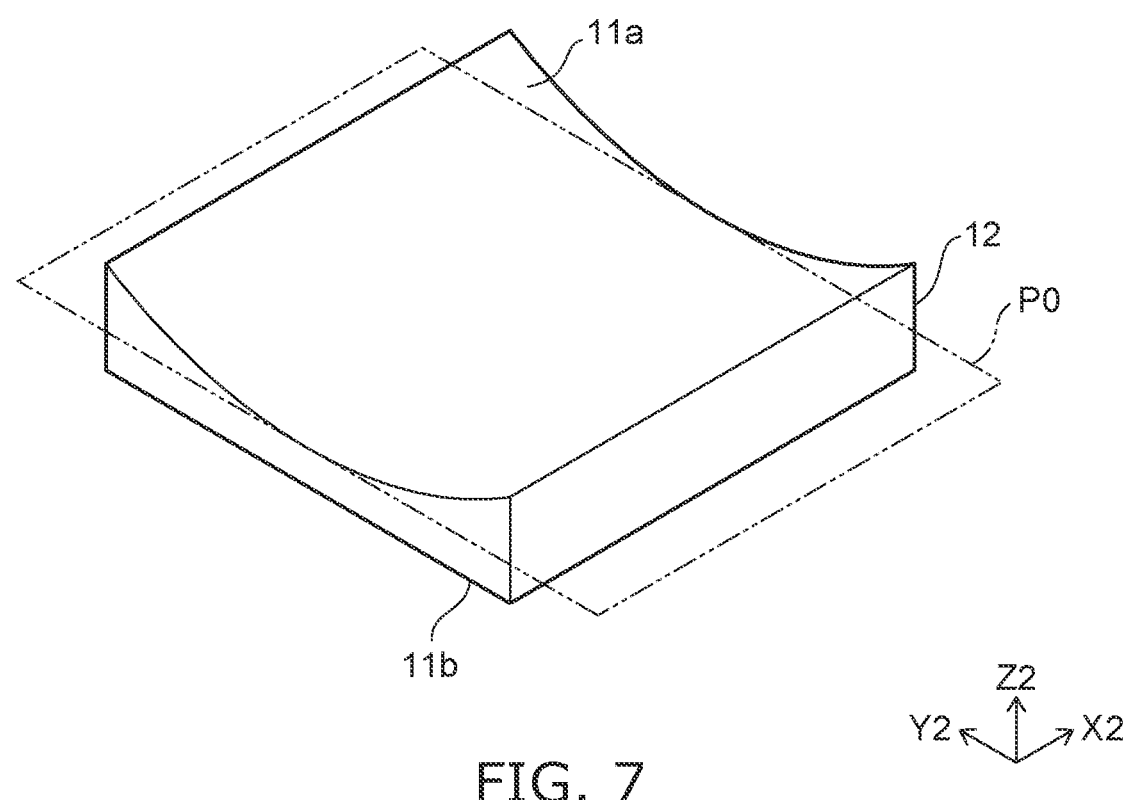
FIG. 7 is a schematic perspective view illustrating a portion, i.e., a base member, of the imaging element of FIG. 6.

FIG. 7 is a schematic perspective view illustrating a portion, i.e., a base member, of the imaging element of FIG. 6.

As shown in FIG. 7, the base member 12 includes the first surface 11$a$ and a second surface 11$b$. The second surface 11$b$ is positioned at a side opposite to the first surface 11$a$.

The three-dimensional orthogonal coordinate system used in the description of the imaging element may be different from the three-dimensional orthogonal coordinate system of the description of the display device 1100(S) shown in FIG. 3A, etc. The three-dimensional orthogonal coordinate system for the description of the imaging element is an orthogonal coordinate system including an X2-axis, a Y2-axis, and a Z2-axis. A direction parallel to the X2-axis may be referred to as the "X2-direction," a direction parallel to the Y2-axis may be referred to as the "Y2-direction," and a direction parallel to the Z2-axis may be referred to as the "Z2-direction." The X2Y2-plane in which the X2-axis and the Y2-axis extend is defined as a plane parallel to the plane P0. The first surface 11a is provided at the positive Z2-axis side of the second surface 11b. The first surface 11a includes a portion of a circular arc that is convex toward the negative-direction side of the Z2-axis when viewed in the Y2Z2-plane. In the specific example below, the plane P0 is a plane parallel to a tangent plane in contact with a point on the circular arc positioned furthest in the negative direction of the Z2-axis.

The first surface 11a is such a curved surface, and the reflector array 20 is provided on the curved surface. The plane P0 is used as a reference surface when setting the tilt in the Y2-axis direction of the reflector row 22. In other words, the reflector row 22 is provided on the first surface 11a at an angle set with respect to the plane P0.

The base member 12 is formed of a light-transmitting material and is formed of, for example, a transparent resin.

In the imaging element 10, when the light source is located at the first surface 11a side with respect to the base member 12, the image is formed not at the second surface 11b side, but at the first surface 11a side at which the light source is located. The position at which the image is formed can be different from the position at which the light source is provided and sufficiently apart from the position at which the light source is provided.

The description continues referring again to FIG. 6.

The reflector row 22 extends along the X2-direction. The plurality of reflector rows 22 are provided to be substantially parallel to each other along the Y2-direction. The plurality of reflector rows 22 are arranged at substantially uniform interval s with the spacings 23 arranged in the Y2-direction, each spacing 23 formed between adjacent two reflector rows 22. The length in the Y2-direction of the spacing 23 of the reflector rows 22 can be any appropriate length, and can be, for example, about the length in the Y2-direction of the reflector row 22. When the light source is located at the first surface 11a side, light rays that are not reflected by the reflector rows 22, reflected light that is reflected once by the reflector row 22, and the like are incident on the region in which the spacing 23 of the reflector rows 22 is formed. Such light rays do not contribute to the image; therefore, the larger the spacing 23, the smaller the ratio of the light rays incident on the imaging element 10 that contribute to the image. Therefore, the length in the Y2-direction of the spacing 23 is set to an appropriate length according to the efficiency of the reflecting surfaces, the dimensions of the dihedral corner reflector described below with reference to FIG. 8, etc. Each reflector row 22 of the reflector rows 22 includes many dihedral corner reflectors connected in the X2-direction and is therefore shown filled-in to avoid complexity in FIG. 6. The imaging element 10 has a laterally-long shape in the X2-direction. Such a shape is advantageous for binocular viewing of the image. The shape of the imaging element 10 when viewed in the X2Y2-plane is not limited thereto, and a longitudinally-long shape in the Y2-direction may be selected depending on applications.

When a mid-air image is formed in the normal direction of the first surface 311a of the imaging element 310a as in the image display device 1000 shown in FIG. 1, the spacing between the adjacent reflector rows 22 is not necessarily provided. When the spacing of the adjacent reflector rows 22 is provided, the spacing of the reflector rows may be a reflecting surface.

Figure 8:
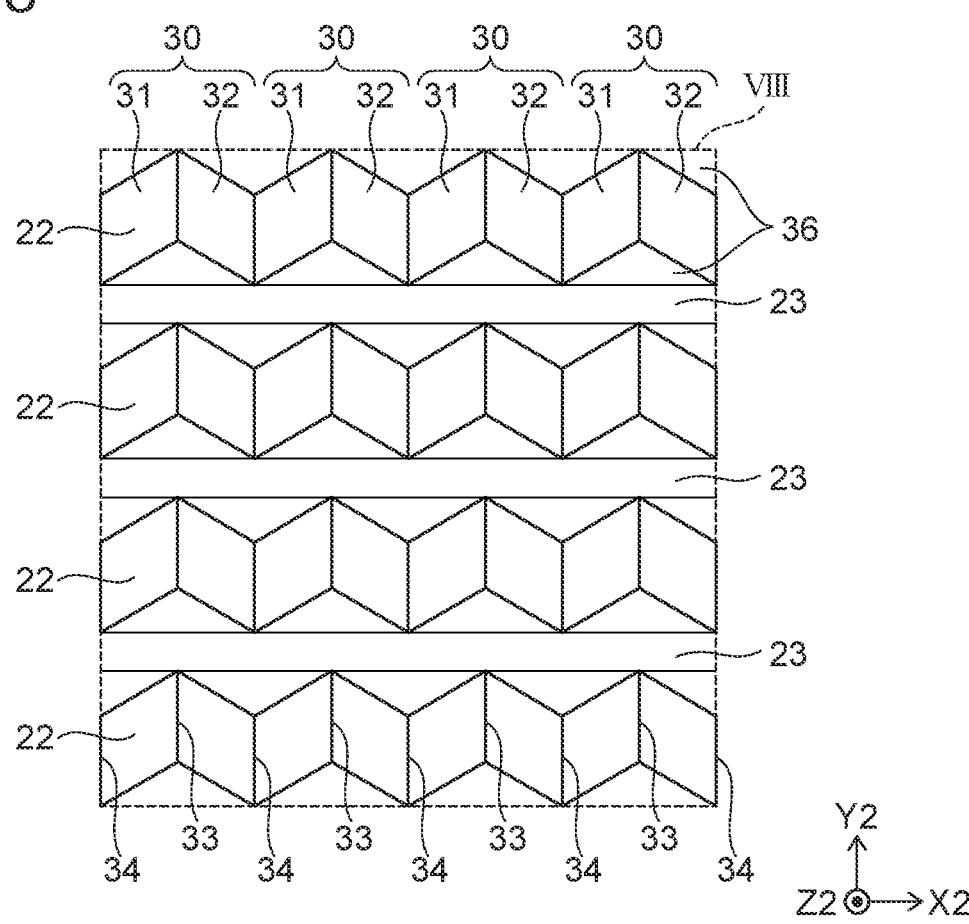
FIG. 8 is an enlarged schematic view of portion VIII of FIG. 6.

FIG. 8 is an enlarged schematic view of portion VIII of FIG. 6.

As shown in FIG. 8, the reflector row 22 includes the plurality of dihedral corner reflectors 30. The plurality of dihedral corner reflectors 30 are connected to each other along the X2-direction and are provided continuously. The dihedral corner reflector 30 includes the first reflecting surface 31 and the second reflecting surface 32. The dihedral corner reflector 30 is provided on a base part 36 formed on the first surface 11a shown in FIG. 6. Each of the first reflecting surface 31 and the second reflecting surface 32 has a substantially square shape in a front-view, and the reflecting surfaces are connected to each other at one side of each of the squares so that the reflecting surfaces are substantially orthogonal to the orientation of the valley.

Hereinbelow, the connecting line between the first reflecting surface 31 and the second reflecting surface 32 of the dihedral corner reflector 30 will be referred to as a "valley-side connecting line 33". Each of an edge of the first reflecting surface 31 positioned at a side opposite to the valley-side connecting line 33 and an edge of the second reflecting surface 32 positioned at the side opposite to the valley-side connecting line 33 is referred to as a hill-side connecting line 34.

The first reflecting surface 31 of the dihedral corner reflector 30 is connected at the hill-side connecting line 34 to the second reflecting surface 32 of the dihedral corner reflector 30 adjacent at the negative-direction side of the X2-axis. The second reflecting surface 32 of the dihedral corner reflector 30 is connected at the hill-side connecting line 34 to the first reflecting surface 31 of another dihedral corner reflector 30 adjacent at the positive-direction side of the X2-axis. Thus, the plurality of dihedral corner reflectors 30 are connected to each other along the X2-direction and are provided continuously.

In the imaging element 10 of the present embodiment, the dimensions of the first and second reflecting surfaces 31 and 32 can be, for example, several μm to several 100 μm. For example, the number of integrated dihedral corner reflectors 30 is set according to the size, resolution, and the like of the mid-air image to be displayed. For example, several tens to several thousand dihedral corner reflectors 30 are integrated inside a single imaging element 10. For example, one thousand dihedral corner reflectors including 100 μm-square reflecting surfaces can be arranged over about 14 cm in the Y2-direction.

As in the enlarged view shown in FIG. 8, the reflector rows 22 of the imaging element 10 are arranged such that the positions in the X2-axis direction of the valley-side connecting lines 33 are the same across the reflector rows 22 and the positions in the X2-axis direction of the hill-side connecting line 34 are the same across the reflector rows 22. Otherwise, the positions in the X2-axis direction of the valley-side connecting line 33 and the hill-side connecting line 34 may be offset between the reflector rows 22.

Figure 9A:
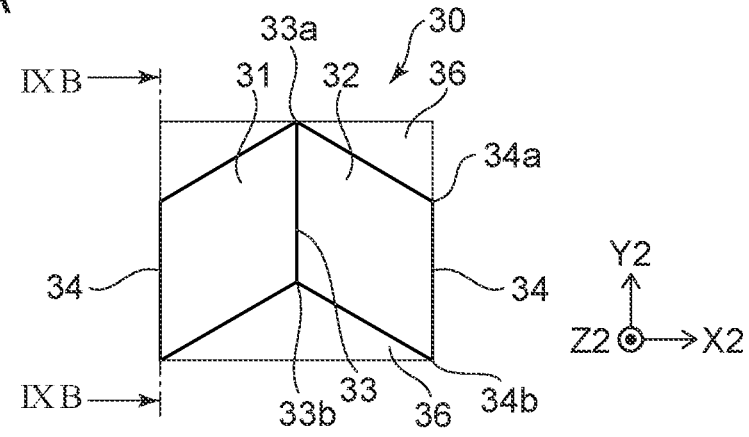
FIG. 9A is a schematic plan view illustrating a portion, i.e., a dihedral corner reflector, of the imaging element of FIG. 8.

FIG. 9A is a schematic plan view illustrating a portion, i.e., the dihedral corner reflector, of the imaging element of FIG. 8.

Figure 9B:
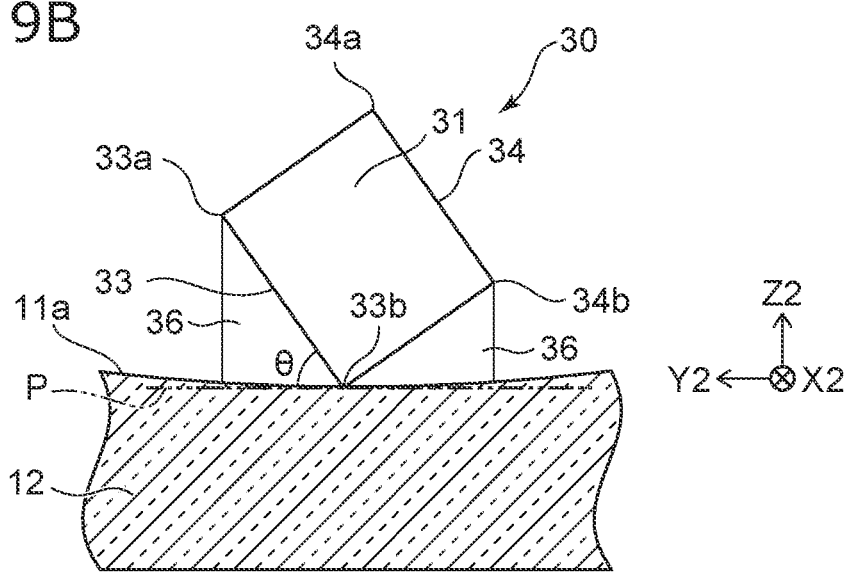
FIG. 9B is an example of a schematic auxiliary cross-sectional view along line IXB-IXB of FIG. 9A.

FIG. 9B is an example of a schematic auxiliary cross-sectional view along line IXB-IXB of FIG. 9A.

As shown in FIGS. 9A and 9B, the dihedral corner reflector 30 includes the first reflecting surface 31 and the second reflecting surface 32, and the first reflecting surface 31 and the second reflecting surface 32 are provided on the base part 36. The base part 36 is provided so that the first reflecting surface 31 and the second reflecting surface 32 are at a desired angle with respect to a tangent plane P of the first surface 11a.

The base part 36 is a light-transmitting member formed in a V-shape, is formed of, for example, a transparent resin, and is molded integrally with the base member 12. The first reflecting surface 31 and the second reflecting surface 32 are formed by depositing a thin film of a light-reflective metal material or the like at the formation location of the V-shape of the base member 12. The formation is not limited to such an example; each or a portion of the first reflecting surface 31, the second reflecting surface 32, the base part 36, and the base member 12 may be formed separately, and assembled into a single body to form the imaging element 10. For example, when a surface of the transparent resin is subjected to mirror finishing or the like and thus a reflectance of the surface of the transparent resin is sufficiently high, the surface of the transparent resin can serve as the first reflecting surface 31 and the second reflecting surface 32. It is favorable for the spacing 23 and/or the base part 36 to be light-transmitting or light-absorbing to prevent virtual image observation, etc.

The first reflecting surface 31 and the second reflecting surface 32 are connected at the valley-side connecting line 33 to be substantially orthogonal to each other. In the first reflecting surface 31, the hill-side connecting line 34 of is positioned at the side opposite to the valley-side connecting line 33; in the second reflecting surface 32, the hill-side connecting line 34 is positioned at the side opposite to the valley-side connecting line 33.

The end portions of the valley-side connecting line 33 are referred to as vertices 33a and 33b. The position of the vertex 33a is further toward the positive Z2-axis side than the position of the vertex 33b. That is, the vertex 33a is positioned farther from the base member 12 than the vertex 33b is. The end portions of the hill-side connecting line 34 are referred to as vertices 34a and 34b. The position of the vertex 34a is further toward the positive Z2-axis side than the position of the vertex 34b. That is, the vertex 34a is positioned farther from the base member 12 than is the vertex 34b. Accordingly, among these, the vertex 34a is positioned to be farthest from the base member 12, and the vertex 33b is positioned nearest to the base member 12.

FIG. 9B shows the relationship between the dihedral corner reflector 30, the first surface 11a, and the tangent plane P. The dihedral corner reflector 30 contacts the first surface 11a at the vertex 33b at the lower side of the valley-side connecting line 33. The tangent plane P is in contact with the first surface 11a at the position of the vertex 33b. The dihedral corner reflector 30 is provided on the first surface 11a so that the valley-side connecting line 33 forms an angle θ with the tangent plane P.

Figure 9C:
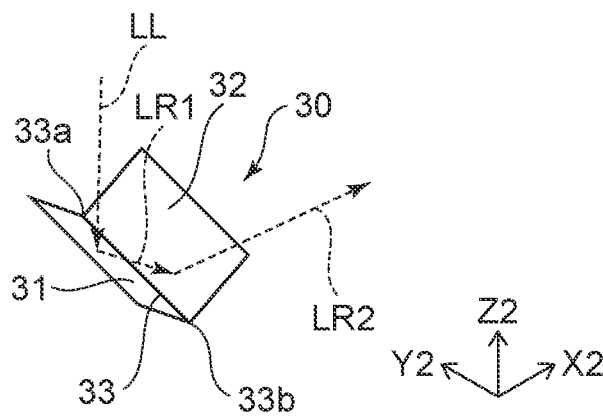
FIG. 9C is a schematic perspective view for describing an operation of the dihedral corner reflector of FIG. 9A.
Figure 9D:
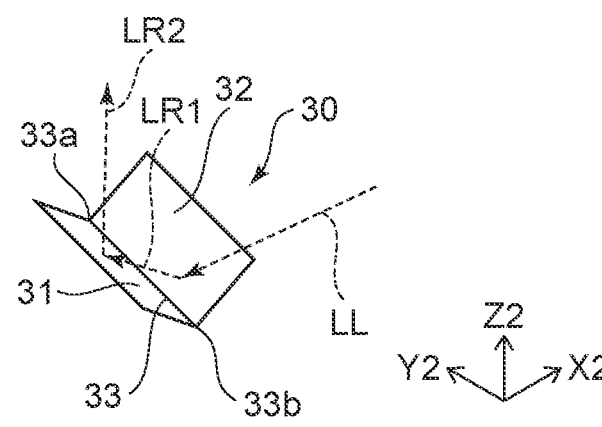
FIG. 9D is a schematic perspective view for describing an operation of the dihedral corner reflector of FIG. 9A.

FIGS. 9C and 9D are schematic perspective views for describing the operation of the dihedral corner reflector of FIG. 9A.

As shown in FIG. 9C, when a light ray LL is incident on the first reflecting surface 31, the light ray LL is reflected at the first reflecting surface 31. Once-reflected light LR1 resulting from reflection at the first reflecting surface 31 is re-reflected at the second reflecting surface 32. Twice-reflected light LR2 resulting from reflection at the second reflecting surface 32 is emitted toward the same side as the light source of the incident light. Thus, the dihedral corner reflector 30 is configured to cause light incident from the first surface 11a side to exit toward a position that is different from a position of the light source and is at the first surface 11a side. Thus, the dihedral corner reflector 30 reflects the light twice at two reflecting surfaces, and causes the twice-reflected light LR2 to travel toward the side from which the incident light ray LL has traveled.

The reflection of the dihedral corner reflector 30 may occur in a reverse manner. When the light ray traveling in a direction opposite to a direction of the twice-reflected light LR2 in FIG. 9C is incident on the dihedral corner reflector 30, the light ray is reflected in a direction opposite to a direction of the incident light ray LL. Specifically, as shown in FIG. 9D, the light ray LL that is incident on the dihedral corner reflector 30 is reflected at the second reflecting surface 32 and incident on the first reflecting surface 31 as the once-reflected light LR1. The once-reflected light LR1 is reflected at the first reflecting surface 31 and exits as the twice-reflected light LR2.

As shown in FIGS. 8 and 9A, the dihedral corner reflector 30 is line-symmetric with respect to the valley-side connecting line 33, and is positioned so that the angle of the first reflecting surface 31 with respect to the tangent plane P is substantially equal to the angle of the second reflecting surface 32 with respect to the tangent plane P. Therefore, when the light ray is initially incident on the first reflecting surface 31, the dihedral corner reflector 30 causes the reflected light to exit the dihedral corner reflector 30 in a manner similar to that when the light ray is initially incident on the second reflecting surface 32. For example, while the light ray LL is initially incident on the first reflecting surface 31 and reflected at the first reflecting surface 31 in FIG. 9C, the reflection of the dihedral corner reflector 30 can be similar to the description described above even when the light ray LL is initially incident on the second reflecting surface 32 and reflected at the second reflecting surface 32. In FIG. 9D, the light ray LL may be initially incident on the first reflecting surface 31, and the once-reflected light from the first reflecting surface 31 may be reflected at the second reflecting surface 32 and exit as the second reflected light. In the description of the imaging element to be given below, unless otherwise specified, a case where the light ray LL is initially reflected at the first reflecting surface 31 will be described.

Figure 10:
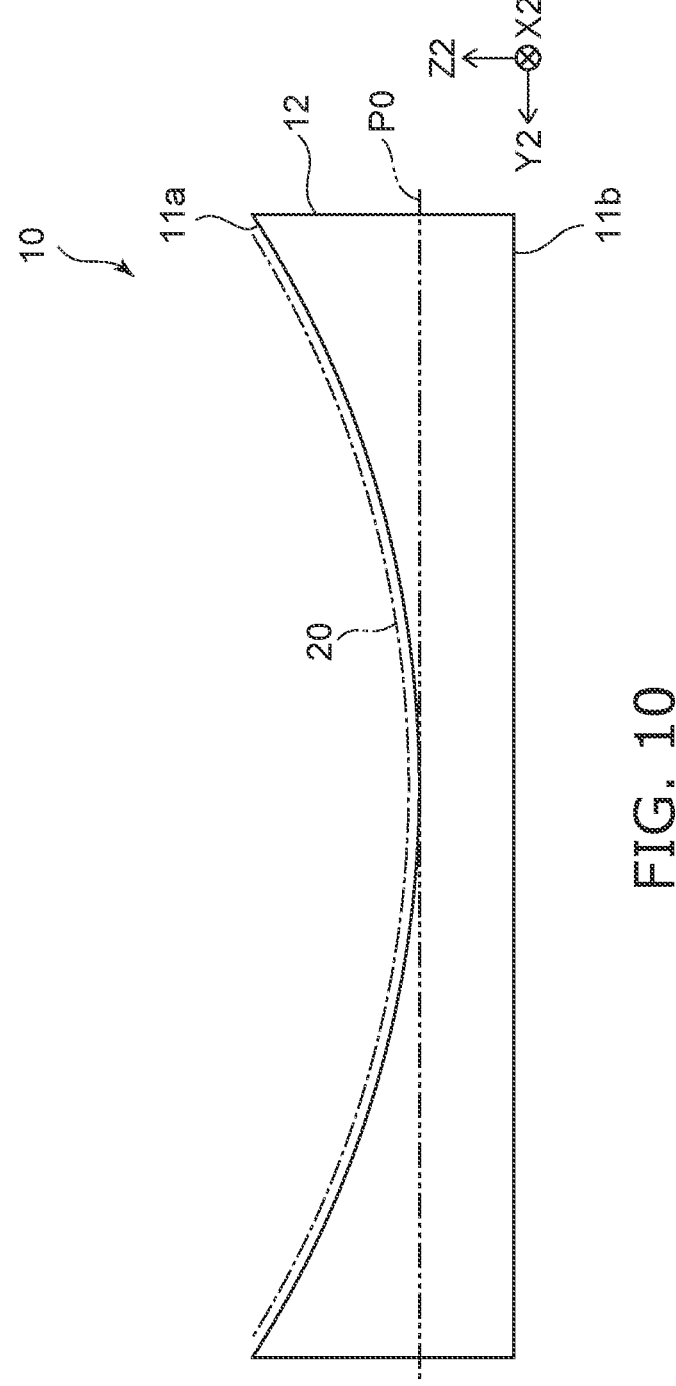
FIG. 10 is a schematic side view illustrating the imaging element of FIG. 6.

FIG. 10 is a schematic side view illustrating the imaging element of FIG. 6.

In FIG. 10, the reflector array 20 is shown by an envelope connecting the vertices 33a of the dihedral corner reflectors 30 shown in FIGS. 9A and 9B. In side views illustrating the imaging element hereinbelow, the reflector array 20 is indicated by the envelope of the vertices 33a of the dihedral corner reflectors 30 as a single dot-dash line as shown in FIG. 10 unless it is necessary to show and describe the configuration of the dihedral corner reflector 30.

In the imaging element 10 as shown in FIG. 10, the first surface 11a is a curved surface, so that the reflector array 20 is provided in a curved shape. The first surface 11a includes a portion of a circular arc that is convex toward the negative-direction side of the Z2-axis when viewed in the Y2Z2-plane; the reflector array 20 also is provided in an arc-like shape, so that also the envelope of the vertices is a circular arc. The radius of the circular arc is set based on the distance between the imaging element 10 and the light source provided at the first surface 11a side of the imaging element 10. For example, the radius of the circular arc of the reflector array 20 is set to about 2 times the distance between the imaging element 10 and the light source.

As described with reference to FIGS. 9C and 9D, the imaging element 10 is configured such that the incident and reflection directions of the light ray are reversible. When the incident and reflection directions of the imaging element 10 are reversed, the radius of the circular arc is set based on the distance between the imaging element 10 and the image formed at the first surface 11a side. Similarly to the description described above, the radius of the circular arc of the reflector array 20 is set to about 2 times the distance between the imaging element 10 and the image.

In the imaging element 10, the tangent plane that is in contact with the first surface 11a at the lowest position in the negative-direction side of the Z2-axis direction is the plane P0 that is parallel to the XY plane.

Figure 11:
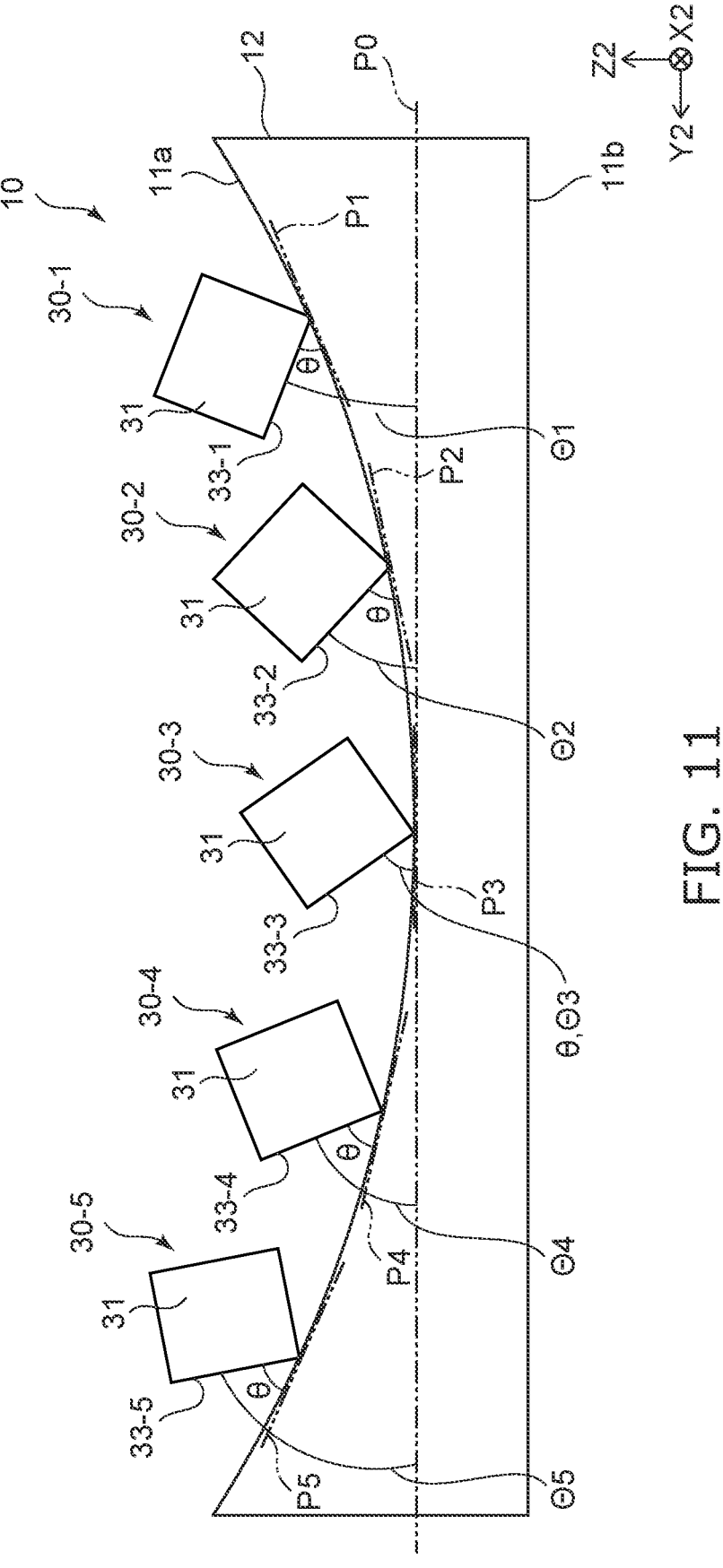
FIG. 11 is a schematic side view illustrating the imaging element of FIG. 6.

FIG. 11 is a schematic side view illustrating the imaging element of FIG. 6.

FIG. 11 shows one dihedral corner reflector included in the reflector rows 22 shown in FIGS. 6 and 8. As described with reference to FIGS. 6 and 8, each reflector row 22 of the plurality of reflector rows 22 extends along the X2-direction, and the plurality of reflector rows 22 are arranged at substantially uniform spacing in the Y2-direction. The angles of the plurality of dihedral corner reflectors included in a single reflector row 22 with respect to the plane P0 are substantially the same. Accordingly, the angle of the dihedral corner reflector 30 with respect to the plane P0 refers to the angle with respect to the plane P0 of the reflector row 22 to which the dihedral corner reflector 30 belongs.

FIG. 11 is an enlarged schematic illustration of five dihedral corner reflectors 30-1 to 30-5 among the many dihedral corner reflectors arranged in the Y2-direction. Although different reference numerals are used to differentiate the positions in the Y2-axis, the configurations of the dihedral corner reflectors 30-1 to 30-5 are the same as that of the dihedral corner reflector 30 described with reference to FIGS. 9A and 9B. The base part 36 shown in FIG. 9B is not illustrated to avoid complexity in the illustration.

As shown in FIG. 11, the dihedral corner reflectors 30-1 to 30-5 are at different angles $\theta 1$ to $\theta 5$ with respect to the plane P0 according to the positions in the Y2-axis along the first surface 11a. The angles $\theta 1$ to $\theta 5$ of the dihedral corner reflectors 30-1 to 30-5 are indicated by the angles of valley-side connecting lines (straight lines) 33-1 to 33-5 with respect to the plane P0.

In the example, the dihedral corner reflectors 30-1 to 30-5 are arranged in this order in the positive direction of the Y2-axis. The angles $\theta 1$ to $\theta 5$ of the dihedral corner reflectors 30-1 to 30-5 are set to increase in this order. That is, the degree of the angles $\theta 1$ to $\theta 5$ are set to $\theta 1 < \theta 2 < \theta 3 < \theta 4 < \theta 5$.

In other words, when a reflector row (a first reflector row) 22 of the dihedral corner reflectors at the smallest angle is set as a reference, the angles $\theta 1$ to $\theta 5$ with the dihedral corner reflectors 30-1 to 30-5 are angles that increase as away from the reference reflector row 22 in one direction along the Y2-axis. Also, the angles $\theta 1$ to $\theta 5$ decrease away from the reference reflector row 22 in the other direction along the Y2-axis. In the example of FIG. 11, the sizes of the angles $\theta 1$ to $\theta 5$ are $\theta 1 < \theta 2 < \theta 3 < \theta 4 < \theta 5$ in the positive direction of the Y2-axis relative to the position of the dihedral corner reflector 30-1 set to be at the smallest angle.

The angles $\theta 1$ to $\theta 5$ of the dihedral corner reflector can be set so that $0° < \theta 1$ to $\theta 5 < 90°$. Although the angles between the first reflecting surface 31 and the plane P0 are determined conjunctively for the angles $\theta 1$ to $\theta 5$, $45° < $(the angle between the first reflecting surface 31 and the plane P0)$< 90°$ can be set. The angle between the second reflecting surface 32 and the plane P0 is equal to the angle between the first reflecting surface 31 and the plane P0. Accordingly, $45° < $(the angle between the second reflecting surface 32 and the plane P0)$< 90°$ can be set.

The tilts of the dihedral corner reflectors 30-1 to 30-5 also may be set as the angles with respect to tangent planes P1 to P5 of the first surface 11a at which the dihedral corner reflectors 30-1 to 30-5 are located. The angles of the dihedral corner reflectors 30-1 to 30-5 with respect to the tangent planes P1 to P5 are set to a constant angle $\theta$ regardless of the positions of the dihedral corner reflectors 30-1 to 30-5 in the Y2-axis. For example, the angle $\theta$ is based on the angle between the horizontal plane and each reflecting surface of a corner cube reflector, and is set to about 30°, and more specifically, 35.3°.

In the imaging element 10 of the example, when referenced to the base member 12, the angles $\theta 1$ to $\theta 5$ of the dihedral corner reflectors 30-1 to 30-5 are appropriately set so that the light rays incident from the light source provided at the first surface 11a side are imaged at the first surface 11a side. The imaging position is at a position in mid-air different from the light source. The angles of the dihedral corner reflectors with respect to the plane P0 are determined by, for example, experiments, simulations, etc.

The angles of the dihedral corner reflectors with respect to the plane P0 are set to increase according to the position in the Y2-axis, or are set to decrease according to the position in the Y2-axis; therefore, the first surface 11a may be a surface that is not a portion of a circular arc of a perfect circle. For example, the first surface 11a may be a portion of an arc of an ellipse, or may be a portion of a polygon corresponding to the number of reflector rows. It is sufficient to set the angles of the dihedral corner reflectors according to the positions of the dihedral corner reflectors in the Y2-axis; therefore, the angles of the dihedral corner reflectors may be set relative to another plane at any angle with respect to the plane P0 instead of setting relative to the plane P0.

Modifications of the imaging element will now be described.

Figure 12A:
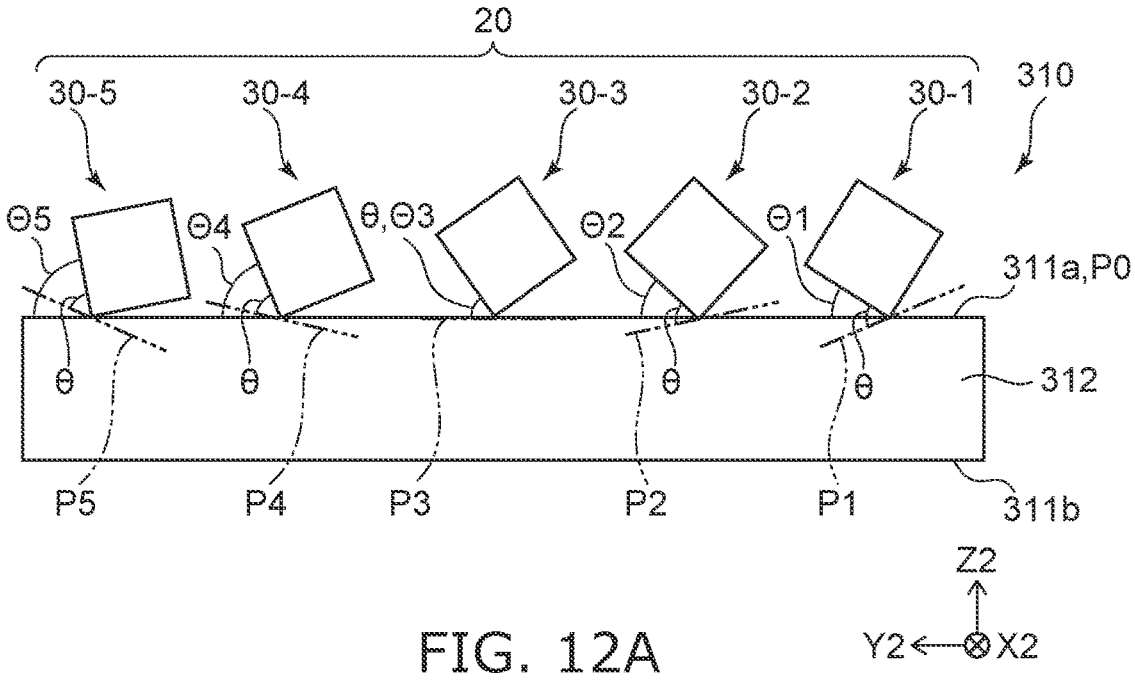
FIG. 12A is a schematic side view illustrating a portion, i.e., a modification of the imaging element, of the image display device according to the first embodiment.

FIG. 12A is a schematic side view illustrating a portion, i.e., a modification of the imaging element, of the image display device according to the first embodiment.

Figure 12B:
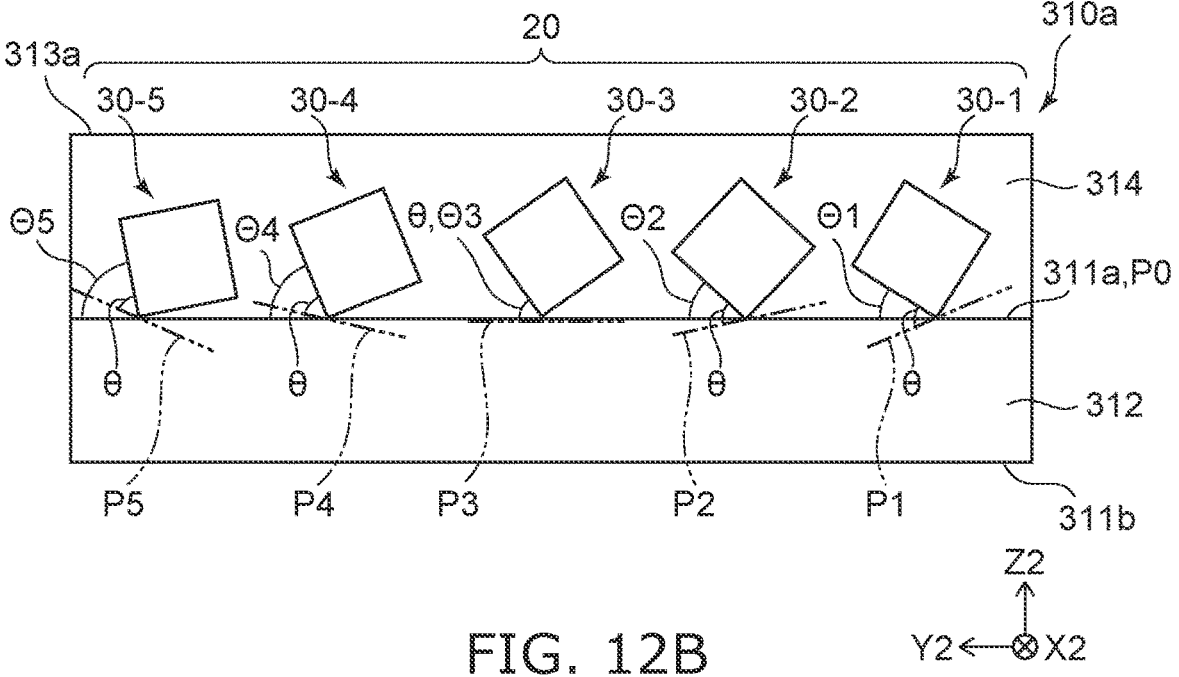
FIG. 12B is a schematic side view illustrating a portion, i.e., another modification of the imaging element, of the image display device according to the first embodiment.

FIG. 12B is a schematic side view illustrating a portion, i.e., another modification of the imaging element, of the image display device according to the first embodiment.

As long as the angles of the dihedral corner reflectors with respect to the plane P0 can be set similarly to the imaging element 10 shown in FIG. 6, the reflector array 20 need not be formed on a curved surface, and may be provided on one plane.

Similarly to the description with reference to FIG. 11, FIGS. 12A and 12B are enlarged schematic illustrations of the five dihedral corner reflectors 30-1 to 30-5. The five dihedral corner reflectors 30-1 to 30-5 are illustrated with tilts corresponding to their positions.

As shown in FIG. 12A, an imaging element 310 of the modification includes the reflector array 20 and a base member 312. The base member 312 includes the first surface 311a and a second surface 311b. The second surface 311b is positioned at a side opposite to the first surface 311a. The first surface 311a is a flat surface substantially parallel to the X2Y2-plane. The first surface 311a may be the plane P0. Similarly to the example shown in FIG. 11, for example, the base member 312 is formed of a light-transmitting material.

The angles of the dihedral corner reflectors 30-1 to 30-5 with respect to the plane P0 are respectively $\theta 1$ to $\theta 5$; and the sizes of the angles $\theta 1$ to $\theta 5$ are $\theta 1 < \theta 2 < \theta 3 < \theta 4 < \theta 5$. The positions of the dihedral corner reflectors 30-1 to 30-5 in the Y2-axis are the same as the positions of the dihedral corner reflectors 30-1 to 30-5 in the Y2-axis shown in FIG. 11.

Accordingly, for the tangent planes P1 to P5 of the circular arc corresponding to the positions in the Y2-axis of FIG. 11, the angles between the dihedral corner reflectors 30-1 to 30-5 and the tangent planes P1 to P5 all have the same angle θ.

As shown in FIG. 12B, the imaging element 310a of the modification includes the reflector array 20 and the base member 312, and further includes a protective layer 314. The configurations of the reflector array 20 and the base member 312 are the same as those of the imaging element 310 described with reference to FIG. 12A. The protective layer 314 is disposed to cover the reflector array 20 and the first surface 311a.

A material having high light transmittance is used for the protective layer 314 so that a substantially constant number of light rays are transmitted when the light rays enter the imaging element 310a via the protective layer 314.

It is favorable for a surface 313a of the protective layer 314 to be sufficiently flat so that the refraction angles of the incident light rays are substantially constant.

In the present modification, the base member 312 can be a flat plate, so that the thickness of the base member necessary to make the first surface and/or the second surface into a curved surface can be reduced; therefore, the imaging elements 310 and 310a can be thinned. The imaging element 310 shown in FIG. 12A is a member in which the reflector array 20 is formed at the first surface 311a of the base member 312, and the second surface 311b has a flat surface. Therefore, production by a pressing machine using a resin base member is favorable. Also, the production of the imaging element 310 is advantageous in production such as ease of production in a roll-to-roll method. The roll-to-roll method is a production technique in which a base member that is wound in a roll shape is continuously supplied to the process for patterning, processing, etc. The roll-to-roll method is widely utilized in the production of plate-shaped or film-like plastic molded products, etc.

The image display device 1000 according to the embodiment includes the imaging element 310a shown in FIG. 12B. The configuration is not limited thereto; the image display device may include any of the imaging elements 10 and 310 described above. The components of the imaging elements 10, 310, and 310a can be combined as appropriate. For example, the protective layer 314 may be provided at the first surface 11a side of the imaging element 10.

The function of the imaging element, including the function principle, will now be described. In the description below, the imaging element 10 that have been described with reference to FIGS. 6 to 11 will be described unless otherwise noted. The functions of the imaging elements 310 and 310a of the modifications can be understood as being similar to those of the imaging element 10.

Figure 13:
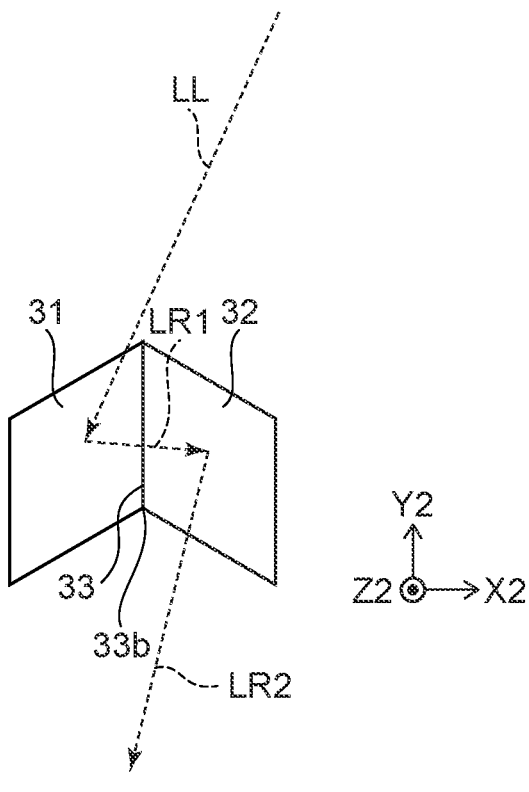
FIG. 13 is a schematic plan view for describing a portion, i.e., an operation of the imaging element, of the image display device according to the first embodiment.

FIG. 13 is a schematic plan view for describing a function of a portion, i.e., the imaging element, of the image display device according to the first embodiment.

As shown in FIG. 13, the first reflecting surface 31 and the second reflecting surface 32 are provided to be substantially orthogonal to each other and connected at the valley-side connecting line 33. The vertex 33b is provided to have a minimum value in the Z2-axis direction.

The light ray LL that is incident on the first reflecting surface 31 is reflected by the first reflecting surface 31. The once-reflected light LR1, which is light having been reflected at the first reflecting surface 31, is reflected at the second reflecting surface 32. Unlike a corner cube reflector (e.g., WO2016/199902), the dihedral corner reflector 30 does not include a third reflecting surface; therefore, the twice-reflected light LR2, which is light having been reflected at the second reflecting surface 32, travels straight. With the valley-side connecting line 33 is provided at a predetermined angle with respect to the X2Y2-plane, the twice-reflected light LR2 that exits the dihedral corner reflector 30 travels toward a side same as the side at which the light ray LL is incident.

Figure 14:
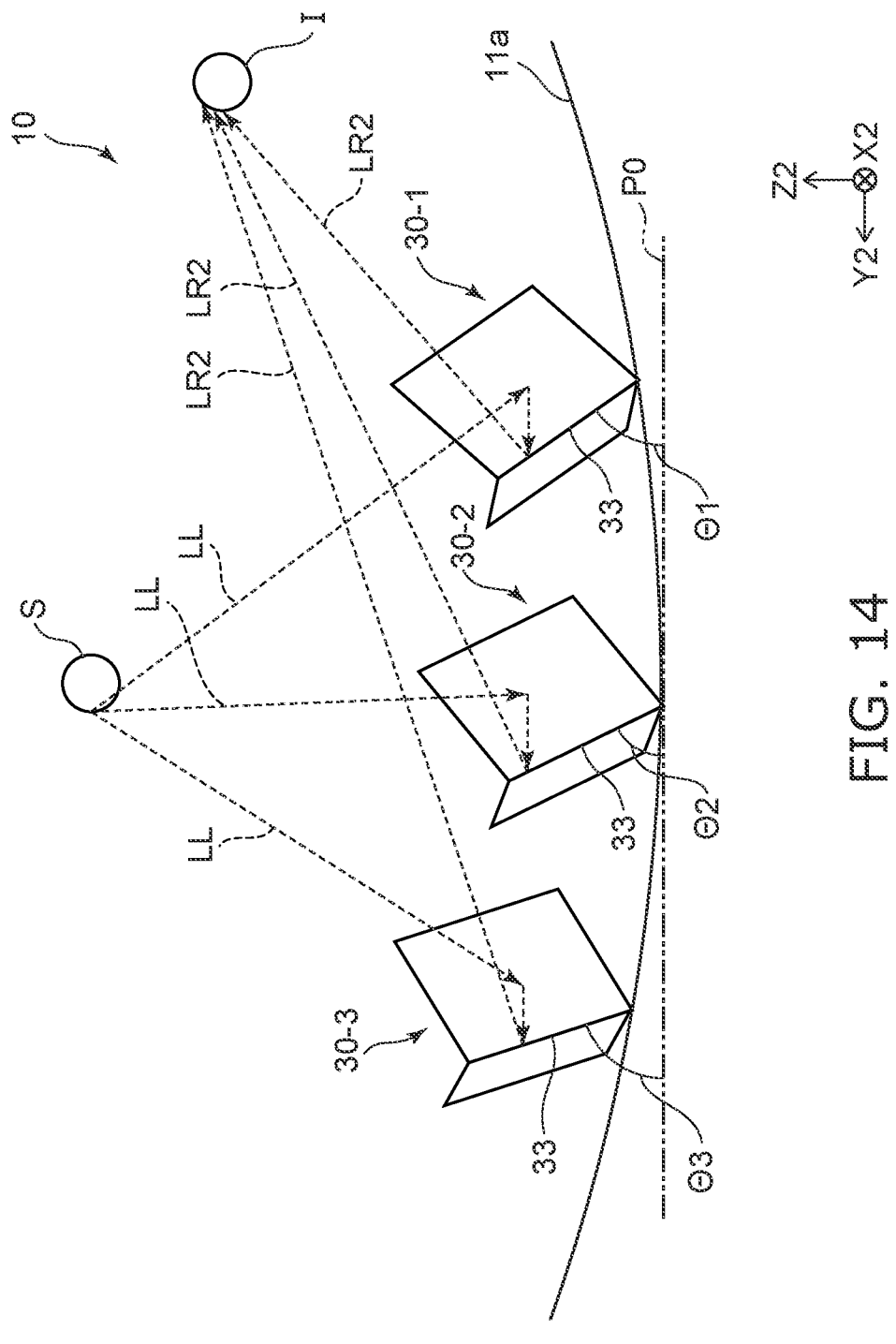
FIG. 14 is a schematic side view for describing a portion, i.e., an operation of the imaging element, of the image display device according to the first embodiment.
Figure 15:
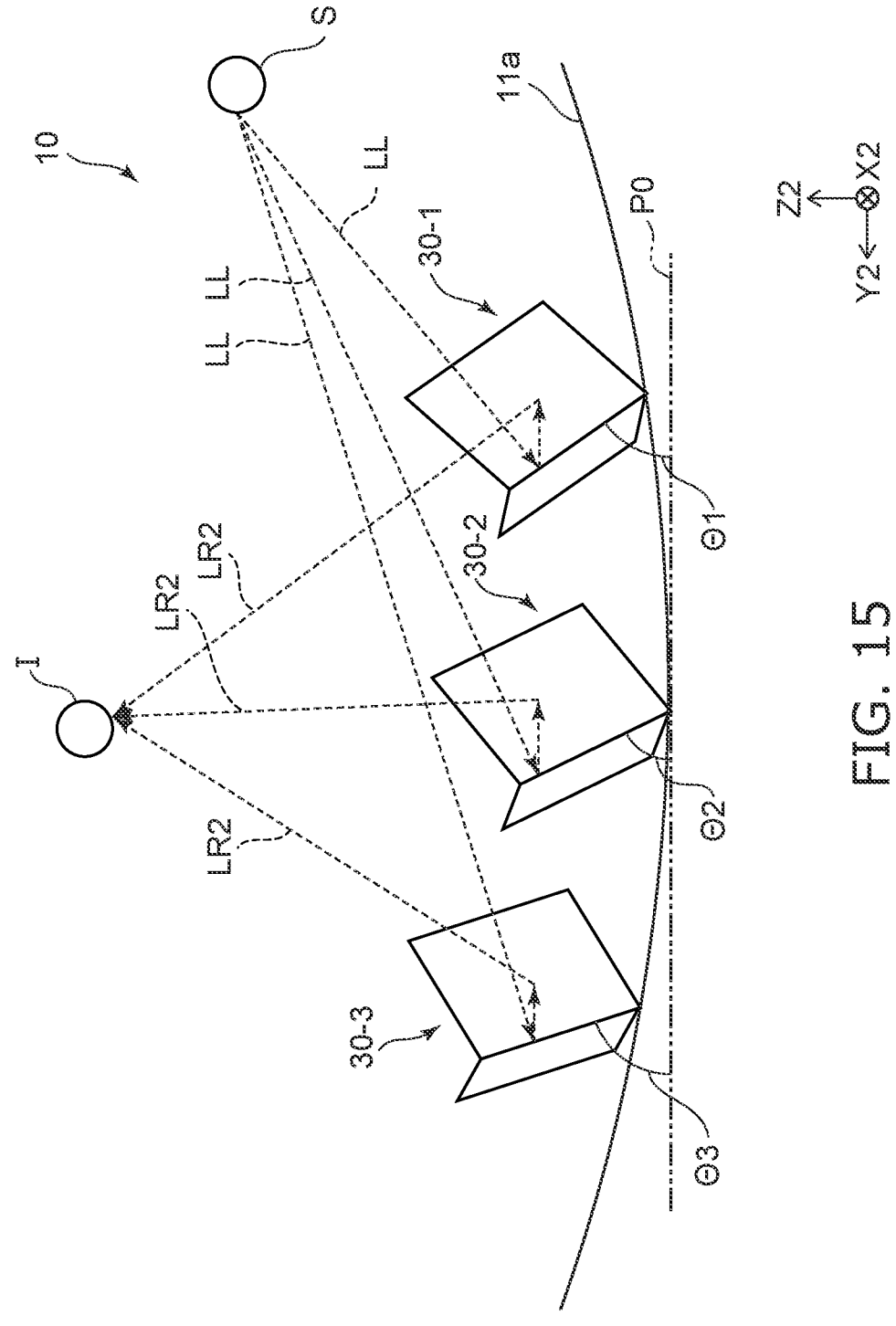
FIG. 15 is a schematic side view for describing a portion, i.e., an operation of the imaging element, of the image display device according to the first embodiment.

FIGS. 14 and 15 are schematic side views for describing a function of a portion, i.e., the imaging element, of the image display device according to the first embodiment.

In the example of FIG. 14, a light source S is located at a position in a direction normal to the plane P0 at the first surface 11a side. In the imaging elements 310 and 310a of the modifications shown in FIGS. 12A and 12B, the light source is located at a position in a direction normal to the first surface 311a at the first surface 311a side.

In the imaging element 10 as shown in FIG. 14, the first surface 11a is set to be a portion of a circular arc that is convex toward the negative-direction side of the Z2-axis when viewed in the YZ plane. The dihedral corner reflectors 30-1 to 30-3 are located on the first surface 11a. In the example, the angles θ1 to θ3 that indicate the tilts of the dihedral corner reflectors 30-1 to 30-3 with respect to the plane P0 are set to increase in the positive direction of the Y2-axis. Thus, by setting such angles θ1 to θ3, the twice-reflected light LR2, which is light that has been reflected twice by the dihedral corner reflector 30, forms an image I at the first surface 11a side at which the light source S is provided.

The imaging element 10 operates even when the position of the light source S and the position of the image I are interchanged.

In FIG. 15, the configurations of the dihedral corner reflectors 30-1 to 30-3 and the relationship between the dihedral corner reflectors 30-1 to 30-3, the first surface 11a, and the plane P0 are the same as those described with reference to FIG. 14.

As shown in FIG. 15, the light source S is provided at the position of the image I described with reference to FIG. 14; in such a case, the image I is formed at the position of the light source S in FIG. 14. The light rays LL that are emitted from the light source S are reflected twice by each of the dihedral corner reflectors 30-1 to 30-3, and the twice-reflected light LR2 forms an image at the position of the image I. That is, in the example, the image I is formed at a location in the direction normal to the plane P0 at the first surface 11a side. In the case of the imaging elements 310 and 310a of the modifications shown in FIGS. 12A and 12B, the image is formed at a location in the direction normal to the first surface 311a at the first surface 311a side.

When the light source S is at either position, the angles of the dihedral corner reflectors can be appropriately set by performing experiments, simulations, or the like so that the light ray incident on the dihedral corner reflector is reflected twice to form the image at the desired position. For example, in the embodiment shown in FIG. 14, the light source S is set to be substantially directly above the reflector array, and in the embodiment shown in FIG. 15, the position at which the image I is formed is set to be substantially directly above the reflector array. It is also possible to appropriately modify the positions of the light source S and the image I by appropriately adjusting the angles of the dihedral corner reflectors with respect to the plane P0. When making such a design modification, ray analysis tools such as ray tracing simulation, etc., can be effectively utilized.

In the image display device 1000 according to the embodiment, the image is formed directly above the reflector array. In such a case as well, it is possible to interchange the position of the display device 1100(S), which is the light source, and the position at which the image I is formed. For the image display device 1000 of FIG. 1, if the position of the display device 1100(S) and the position at which the image is formed are interchanged, it is necessary to modify the configurations of the housing and the light-transmitting member according to the optical path after interchanging.

Returning to FIG. 1, a series of operations of the image display device 1000 according to the present embodiment is as follows. That is, the light that is emitted from the display device 1100(S) located in the display module 1210 is incident on the imaging element 310a via the optical system 1200.

The imaging element 310a sequentially reflects the incident light L by two reflecting surfaces of the dihedral corner reflector of the reflector array of the imaging element 310a. The imaging element 310a causes the reflected light R, which is light incident on the imaging element 310a and then reflected twice, to exit toward a region directly above the imaging element 310a.

The reflected light R that has exited the imaging element 310a exits the housing via the light-transmitting member 1320 provided in the housing 1300, and forms the image I1 between the observer O1 and the light-transmitting member 1320.

Modification

Figure 16:
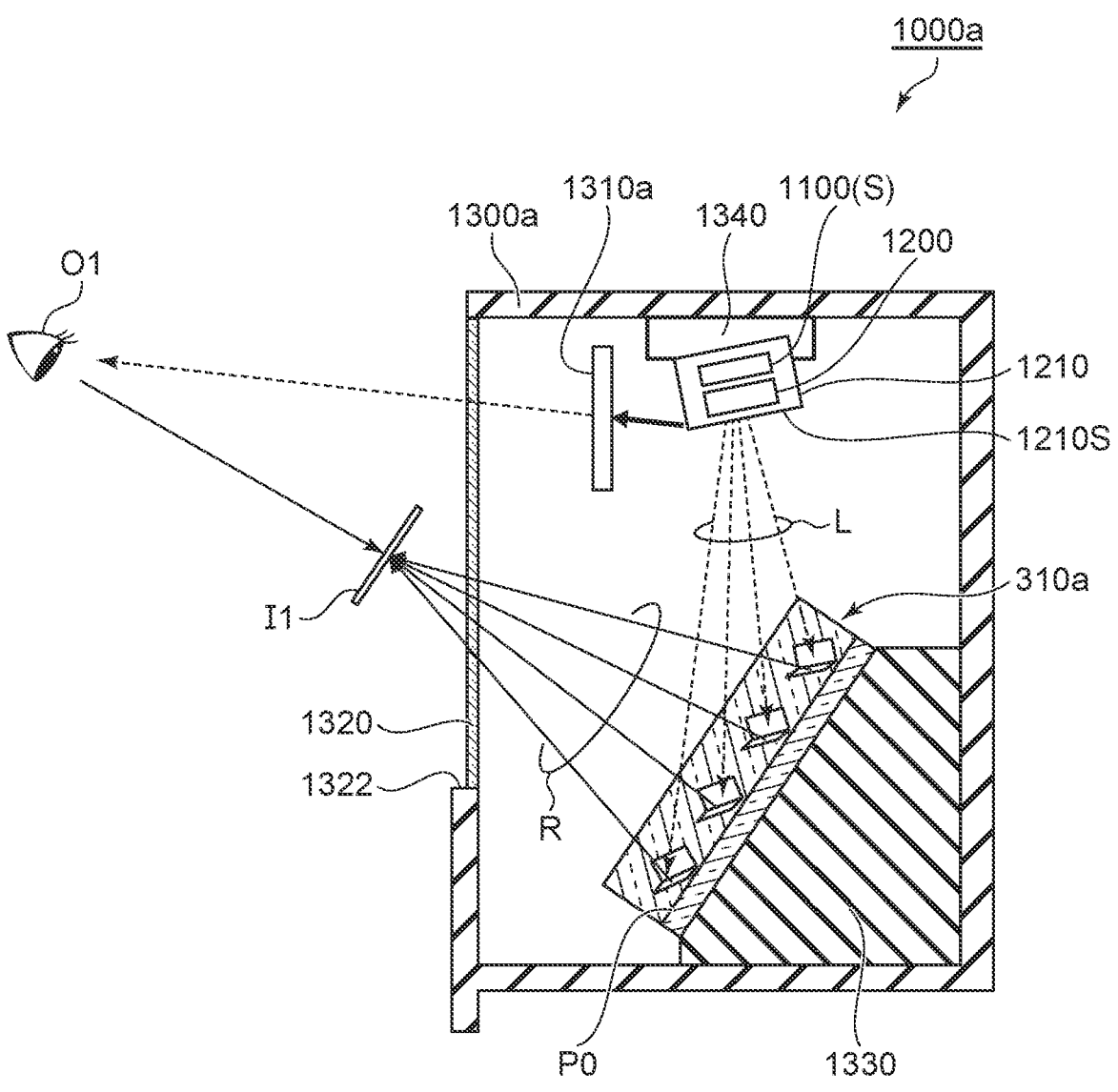
FIG. 16 is a schematic cross-sectional view illustrating an image display device according to a modification of the first embodiment.

FIG. 16 is a schematic cross-sectional view illustrating an image display device according to a modification of the first embodiment.

In the image display device 1000 shown in FIG. 1, the light-shielding member 1310 is located at the inner wall of the housing 1300, and the display device 1100(S), the optical system 1200, and the imaging element 310a are housed inside the housing 1300; however, the configuration is not limited thereto. The image display device 1000a according to the modification described below includes a light-shielding member 1310a that is separate from a housing 1300a.

As shown in FIG. 16, the image display device 1000a according to the modification includes the imaging element 310a, the display device 1100(S), the optical system 1200, the housing 1300a, the light-shielding member 1310a, and the light-transmitting member 1320. The configurations of the imaging element 310a, the display device 1100(S), the optical system 1200, and the light-transmitting member 1320 are the same as those of the image display device 1000 according to the first embodiment shown in FIG. 1. The same components as those of the image display device 1000 according to the first embodiment are denoted with the same reference numerals, and a detailed description will be omitted as appropriate.

In the image display device 1000a, the housing 1300a is provided around the display module 1210 in which the display device 1100(S) and the optical system 1200 are formed in a single body. The display module 1210 is located inside the housing 1300a via a display module support member 1340 located at a ceiling part inside the housing 1300a. The light-shielding member 1310a is located between the display device 1100(S) and the light-transmitting member 1320. In the present example, the light-shielding member 1310a is a member separate from the housing 1300a. The light-shielding member 1310a is a plate-shaped member and is, for example, a plate shaped member with a black coating, which absorbs light, on a surface thereof. The light-shielding member 1310a is provided to shield light leaking to the periphery of the display device 1100(S).

The light-shielding member is not limited to this example and may be a cylindrical member that surrounds the entire periphery of the display module 1210 including the display device 1100(S), and has an opening provided for an emission surface 1210S of the light L of the display module 1210. For example, the cylindrical module housing 1212 of the display module 1210 shown in FIG. 2 may function as the light-shielding member by coating the inner wall of the module housing 1212 to be black, or by using the module housing 1212 that is formed of a black resin.

The light-transmitting member 1320 is provided in a portion of the housing 1300a. More specifically, the light-transmitting member 1320 is located at the position of the window frame 1322 formed in a portion of the housing 1300a. In the housing 1300a, with the increase in size of opening formed by the window frame 1322 and increase in the area of the light-transmitting member 1320, the image display device 1000a can display a large image in mid-air. On the other hand, by increasing the area of the light-transmitting member 1320 and the area of the opening of the window frame 1322, the leakage of the light from the display device 1100(S) located inside the housing 1300a to the outside of the housing 1300a via the light-transmitting member 1320 is considered to occur more easily. In the present modification, the light-shielding member 1310a is provided between the display device 1100(S) and the light-transmitting member 1320, so that the leakage of the light can be prevented from being observed by the observer O1, and thus a larger image can be displayed in mid-air.

Effects of the image display device 1000 according to the present embodiment and the image display device 1000a according to the modification will now be described.

The image display device 1000 according to the embodiment includes the imaging element 310a. In the imaging element 310a as shown in FIG. 8, FIG. 12B, etc., the angles of the dihedral corner reflectors 30 with respect to the plane P0 are set to be greater than 0° and less than 90°. Also, the angles of the dihedral corner reflectors 30 with respect to the plane P0 are set to be varied according to the position at which the dihedral corner reflector 30 is arranged in the Y2-axis direction. This angle is set to increase away from the dihedral corner reflector 30 of the reference position in one direction of the Y2-axis direction, and is set to decrease away from the dihedral corner reflector 30 of the reference position in the other direction of the Y2-axis direction. With such a setting, the light ray from the first surface 311a side with respect to the base member 312 can be reflected twice, and an image can be formed at the first surface 311a side.

In the imaging element 310a, by appropriately setting the angles of the dihedral corner reflector 30 with respect to the plane P0, the display device 1100(S) can be located at any position at the first surface 311a side with respect to the base member 312, and the image I1 can be formed at the desired position directly above the reflector array.

Figure 17A:
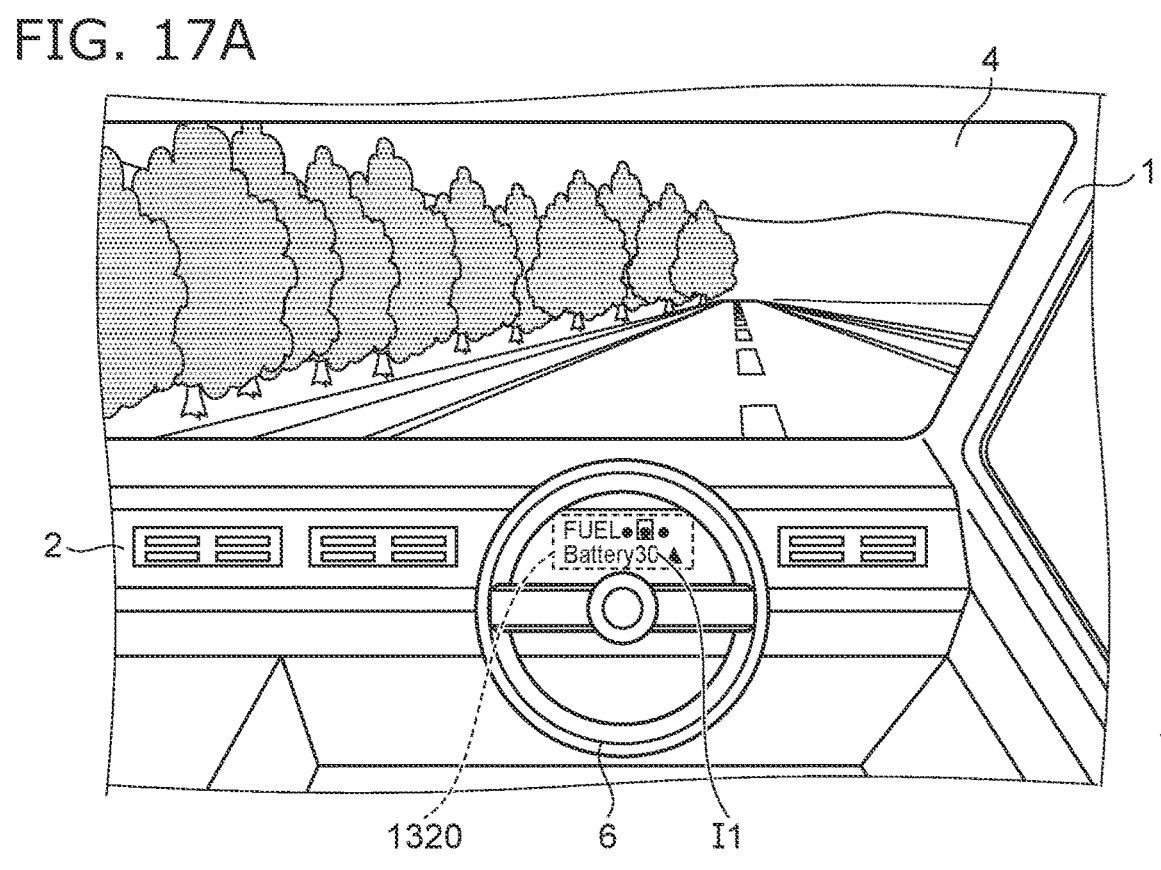
FIG. 17A is a schematic view for describing an operation of the image display device according to the first embodiment.
Figure 17B:
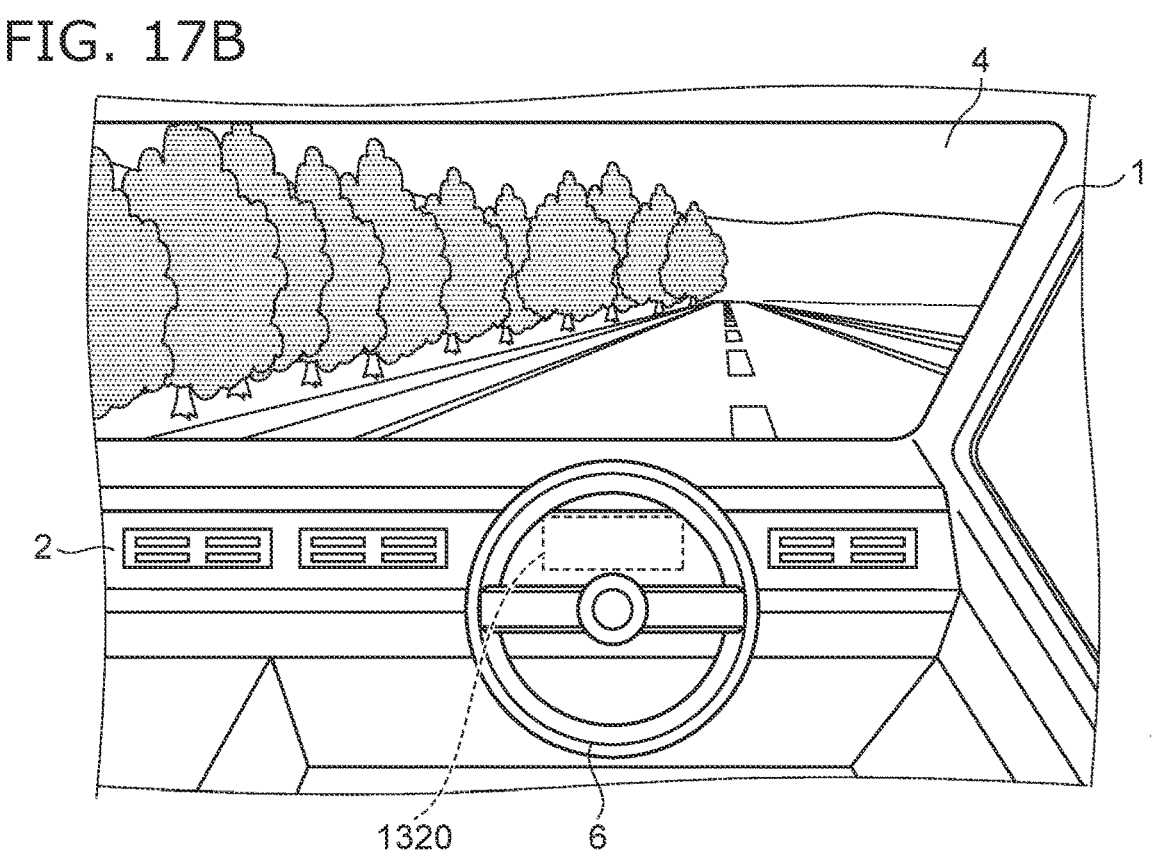
FIG. 17B is a schematic view for describing an operation of the image display device according to the first embodiment.

FIGS. 17A and 17B are schematic views for describing operations of the image display device according to the first embodiment.

The light that is emitted from the display device 1100(S) is reflected twice by the imaging element 310a to form an image in mid-air, and the image that is output by the display device 1100(S) is displayed in mid-air. Whether or not to display the image in mid-air can be easily changed by controlling the output of the display device 1100(S). The image display device 1000 is applicable to, for example, the display of an instrument panel of a vehicle.

FIGS. 17A and 17B schematically show visual information viewed by a driver seated on the driver's seat of a vehicle 1. The driver who is seated in the vehicle 1 operates the vehicle 1 while viewing the scene ahead through a front windshield 4. A dashboard 2 is located below the windshield 4, and the image display device 1000 shown in FIG. 1 is housed inside the dashboard 2. The light-transmitting member 1320 of the image display device 1000 is located in the dashboard 2 in front of the driver. In the example, the light-transmitting member 1320 has the same pattern as the dashboard 2.

As shown in FIG. 17A, information such as the speed indication, fuel level, battery level, or the like is displayed in mid-air via the light-transmitting member 1320 as necessary. In the example, a steering wheel 6 is located frontward of the driver, and the image I1 that is displayed in mid-air can be displayed at the dashboard 2 side of the steering wheel 6 or at the driver side of the steering wheel 6.

As shown in FIG. 17B, information such as speed indication and the like may be undisplayed when unnecessary. By not displaying the mid-air display of the image I1, for example, the driver can concentrate on driving.

The display and non-display of the image I1 can be switched by, for example, an operation of the driver. Examples of the operation of the driver include a button operation or key operation by the driver, driver voice recognition, etc. The display or non-display of the image I1 may be switched by another trigger. For example, when the information of the image I1 is the speed indication, the trigger can be when the speed reaches a predetermined speed. When the information of the image I1 is the fuel level and/or the battery level, the trigger can be a case in which these levels reach a predetermined value or prescribed ratio. Such displays are examples; any information display can be appropriately set based on quantitative information that can be acquired.

The image display device 1000 according to the embodiment includes the optical system 1200. The optical system 1200 is located between the display device 1100(S) and the imaging element 310a and can include a plurality of optical lenses; therefore, the image that is formed by the light emitted from the display device 1100(S) can be enlarged. Therefore, the distance between the display device 1100(S) and the imaging element 310a can be adjusted, and the image display device 1000 can be smaller. Combinations of multiple optical lenses allows for not only enlarging the image, but also reducing the image. By using a display device 1100(S) having a large size and then reducing the image, the luminance of the image can be increased, and important information can be displayed more brightly and clearly in mid-air.

The display device 1100(S) can include an LED element in the pixel, and the LED element can be formed of a gallium nitride compound semiconductor. An LED element that is formed of a gallium nitride compound semiconductor can emit light of high luminance with low power consumption. Therefore, a clear image can be displayed in mid-air even when the light emitted from the display device 1100(S) travels along a long optical path.

Other than effects similar to the effects of the image display device 1000, the image display device 1000a according to the modification has the following effects. The image display device 1000a includes the light-shielding member 1310a between the display device 1100(S) and the light-transmitting member 1320. With such a light-shielding member 1310a, in addition to the effects described above, the area of the light-transmitting member 1320 can be increased, and thus a larger image can be displayed in mid-air.

Second Embodiment

Figure 18:
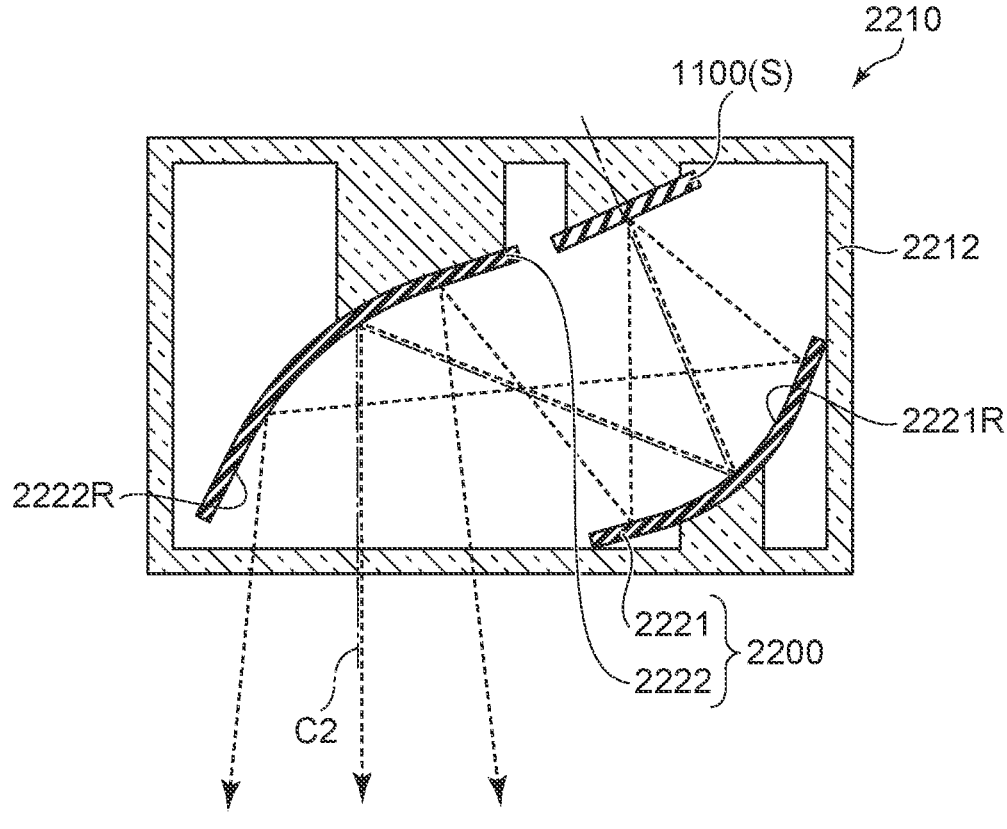
FIG. 18 is a schematic view illustrating a portion, i.e., an optical system, of an image display device according to a second embodiment.

FIG. 18 is a schematic view illustrating a portion, i.e., an optical system, of an image display device according to a second embodiment.

The configuration of the optical system is not limited to the example of the optical system 1200 shown in FIG. 2, and may include one or more reflective mirrors.

As shown in FIG. 18, the image display device according to the embodiment includes an optical system 2200 instead of the optical system 1200 of the image display device 1000 according to the first embodiment. The configuration other than the optical system 2200 is the same as that of the image display device 1000 according to the first embodiment. The same components as those of the image display device 1000 according to the first embodiment are denoted with the same reference numerals, and a detailed description thereof is omitted as appropriate.

In the example, the display device 1100(S) and the optical system 2200 are included in one display module 2210. The optical system 2200 includes two reflective mirrors 2221 and 2222. Each of the two reflective mirrors 2221 and 2222 is a concave mirror. The image display device according to the embodiment is realized by replacing the display module 1210 with the display module 2210 in the image display device 1000 according to the first embodiment shown in FIG. 1.

The reflective mirror 2221 is disposed such that a reflecting surface 2221R of the reflective mirror 2221 substantially faces the display device 1100(S). The reflective mirror 2222 is disposed such that a reflecting surface 2222R of the reflective mirror 2222 faces the reflecting surface 2221R of the reflective mirror 2221. An optical axis C2 passes through the center of the display device 1100(S) shown in FIG. 3A and passes at the centers of the reflective mirrors 2221 and 2222. The arrangement of the display device 1100(S) and the reflective mirrors 2221 and 2222 allows the optical axis C2 to be bent twice.

The curvature of the reflecting surface 2222R of the reflective mirror 2222 is set to be less than the curvature of the reflecting surface 2221R of the reflective mirror 2221. Therefore, the real image formed of the light output from the display device 1100(S) is gradually enlarged by the reflective mirrors 2221 and 2222.

Effects of the image display device according to the present embodiment will now be described.

The image display device according to the present embodiment has effects similar to those of the image display device 1000 according to the first embodiment. Also, the image display device according to the embodiment has the following effects.

The image display device according to the present embodiment includes the optical system 2200 that includes a plurality of reflective mirrors. In the image display device, the optical system 2200 includes the reflective mirrors 2221 and 2222, and the reflective mirror 2221 is disposed to face the display device 1100(S), so that the optical axis C2 can be bent a plurality of times. The optical axis C2 of the optical system 2200 of the example is bent twice by the two reflective mirrors 2221 and 2222. Among the two bends of the optical axis C2, the first bend occurs toward a side at which the display device 1100(S) is located; therefore, a long optical path is realized without increasing the volume occupied by the optical system 2200. The optical system 2200 can form a real image having a sufficient size by providing the reflective mirrors to have concave surfaces of small curvatures in a sufficiently long optical path.

Third Embodiment

Figure 19:
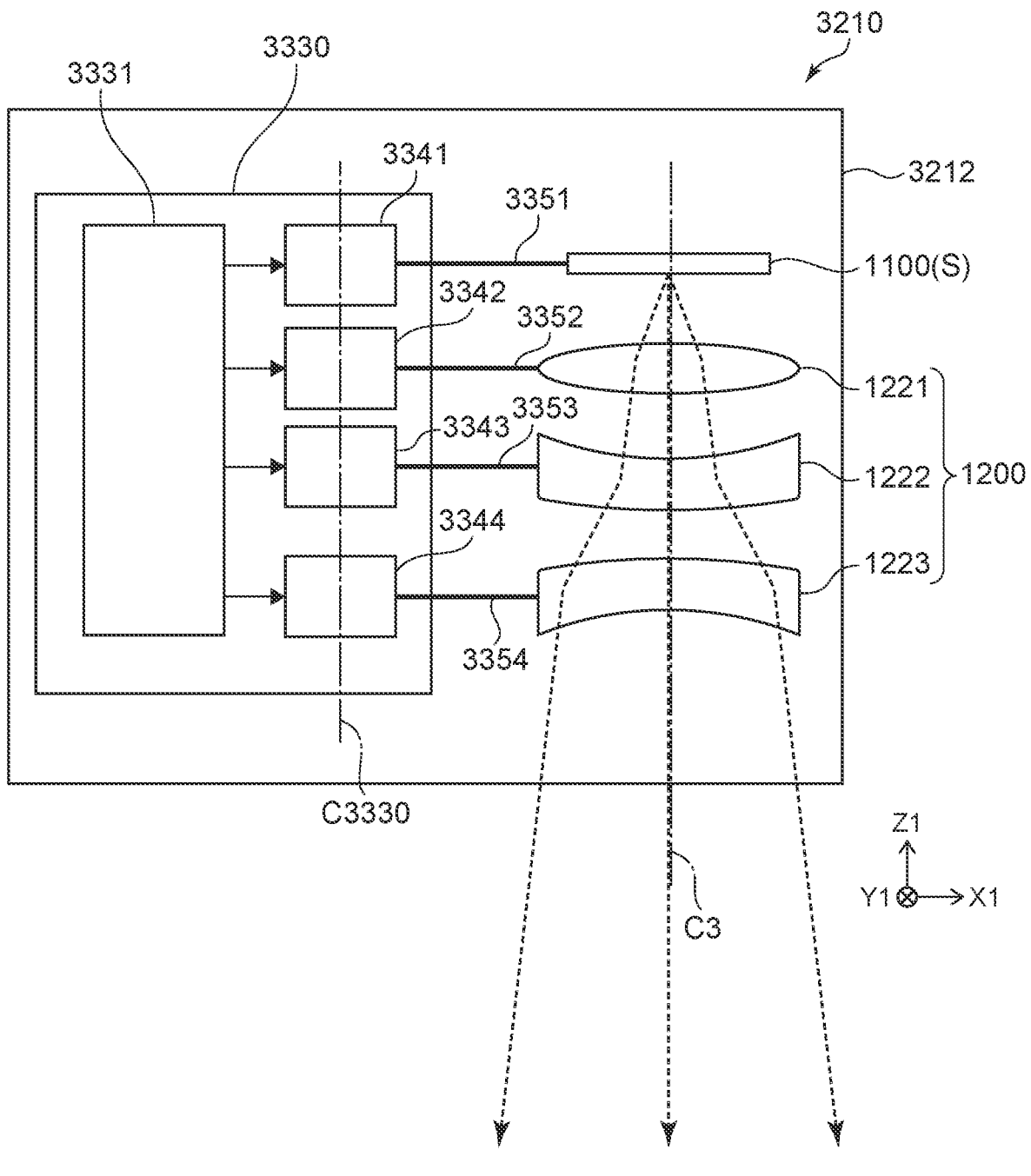
FIG. 19 is a schematic view illustrating a portion, i.e., an optical system, of an image display device according to a third embodiment.

FIG. 19 is a schematic view illustrating a portion, i.e., an optical system, of an image display device according to a third embodiment.

As shown in FIG. 19, the image display device according to the present embodiment further includes an optical system control device 3330. The configurations of the display device 1100(S) and the optical system 1200 are the same as those of the image display device 1000 according to the first embodiment. The same components as the components of the image display device 1000 according to the first embodiment are denoted with the same reference numerals, and a detailed description thereof is omitted as appropriate. The X1Y1Z1-coordinate system shown in FIG. 3A and other figures is used as the three-dimensional orthogonal coordinate system.

In the example, the display device 1100(S), the optical system 1200, and the optical system control device 3330 are included in a single display module 3210. The display module 3210 includes a module housing 3212, and the display device 1100(S), the optical system 1200, and the optical system control device 3330 are housed inside the module housing 3212. The image display device according to the present embodiment is realized by replacing the display module 1210 with the display module 3210 in the image display device 1000 according to the first embodiment shown in FIG. 1.

An optical axis C3 of the display device 1100(S) and the optical system 1200 initially coincides with the optical axis C1 described with reference to FIG. 2. In other words, the initial optical axis C3 coincides with the center of the display device 1100(S) shown in FIG. 3A and coincides with the optical axis of the optical system 1200.

The optical system control device 3330 supports the display device 1100(S) with an arm 3351. The optical system control device 3330 supports the optical lens 1221 with an arm 3352. The optical system control device 3330 supports an optical lens 1222 with an arm 3353. The optical system control device 3330 supports an optical lens 1223 with an arm 3354.

The optical system control device 3330 includes a controlling unit 3331 and driving units 3341 to 3344. The controlling unit 3331 is connected to each of the driving units 3341 to 3344 and outputs commands that drive the driving units 3341 to 3344 to the driving units 3341 to 3344.

The driving units 3341 to 3344 have the same rotation axis C3330 in the Z1-direction. The driving units 3341 to 3344 are rotated at the same rotation angle in the same clockwise or counterclockwise rotational direction around the rotation axis C3330 in response to commands from the controlling unit 3331. Therefore, the optical axis C3 of the display device 1100(S) and the optical system 1200 can be rotated at the same rotation angle in the same clockwise or counterclockwise rotational direction around the rotation axis C3330. Accordingly, the formation position of the real image formed of the light emitted by the display device 1100(S) and the optical system 1200 can be shifted around the rotation axis C3330.

The driving units 3341 to 3344 can extend and retract the arms 3351 to 3354 by the same length in a plane parallel to the X1Y1-plane in response to commands from the controlling unit 3331. Therefore, the optical axis C3 of the display device 1100(S) and the optical system 1200 is shifted to any coordinate in the plane parallel to the X1Y1-plane. Accordingly, the formation position of the real image formed of the light emitted by the display device 1100(S) and the optical system 1200 can be shifted to any position in the plane parallel to the X1Y1-plane.

The driving units 3341 to 3344 causes the arms 3351 to 3354 to move to shift their positions along the Z1-axis in response to commands from the controlling unit 3331. Therefore, the distance between the display device 1100(S) and the optical system 1200 can be modified, and the size of the real image formed of the light emitted by the display device 1100(S) and the optical system 1200 can be modified.

The rotations of the driving units 3341 to 3344 around the rotation axis C3330 are not limited to the case where all of the driving units 3341 to 3344 rotate the same rotation angle in the same direction. For example, the optical lenses may be rotated at different rotation angles.

The extensions and retractions of the arms 3351 to 3354 due to the driving units 3341 to 3344 are not limited to the case where the optical axes C3 of the display device 1100(S) and the optical system 1200 coincides. For example, the extension/contraction length of the arm may be different between the optical lenses.

The driving units 3341 to 3344 may be configured to rotate the arms 3351 to 3354 around a central axis along the extension directions of the arms 3351 to 3354 in response to commands from the controlling unit 3331.

As described above, the optical system control device 3330 can modify the size, shape, position, orientation, etc., of the real image formed of the light emitted by the display device 1100(S) and the optical system 1200.

Although the optical system 1200 described above is the same as the optical system 1200 of the image display device 1000 according to the first embodiment, the optical system 1200 is not limited thereto. For example, the optical system 1200 may be the optical system 2200 of the image display device according to the second embodiment, and the positions and angles of the plurality of reflective mirrors 2221 and 2222 may be modified by an optical system control device. Alternatively, the optical system may include one or more freeform mirrors, and the position and/or angle of the freeform mirror may be modified by the optical system control device.

The optical system control device 3330 may configured to operate by an operation of the observer O1 shown in FIG. 1, or may be configured to operate by the operation of an operator of the image display device other than the observer O1.

Effects of the image display device according to the embodiment will now be described.

The image display device according to the present embodiment has effects similar to those of the image display device 1000 according to the first embodiment. The image display device according to the present embodiment also has the following effects.

In the image display device according to the present embodiment, inclusion of the optical system control device 3330 described above allows the real image that is formed of the light emitted from the display device 1100(S) and the optical system 1200 to be modified into the desired size, shape, position, orientation, etc., and then to be irradiated on the imaging element 310*a*. Therefore, the image display device can use the imaging element 310*a* to form a mid-air image that is modified to have the desired size, shape, position, orientation, etc. Although distortion of the image I1 may occur when the display device 1100(S) is not mounted to be parallel to the plane P0, it is also possible to correct such distortion.

Fourth Embodiment

Figure 20A:
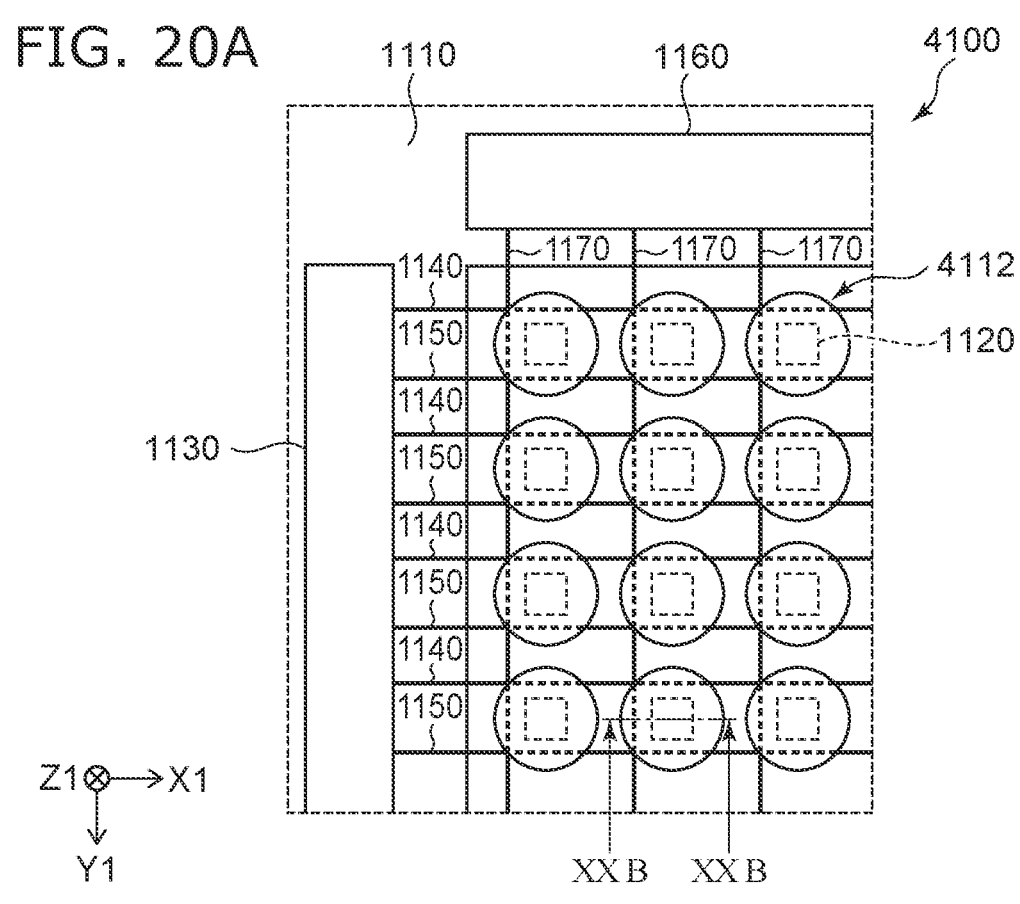
FIG. 20A is a schematic plan view illustrating a portion, i.e., a display device, of an image display device according to a fourth embodiment.

FIG. 20A is a schematic plan view illustrating a portion, i.e., a display device, of an image display device according to a fourth embodiment.

Figure 20B:
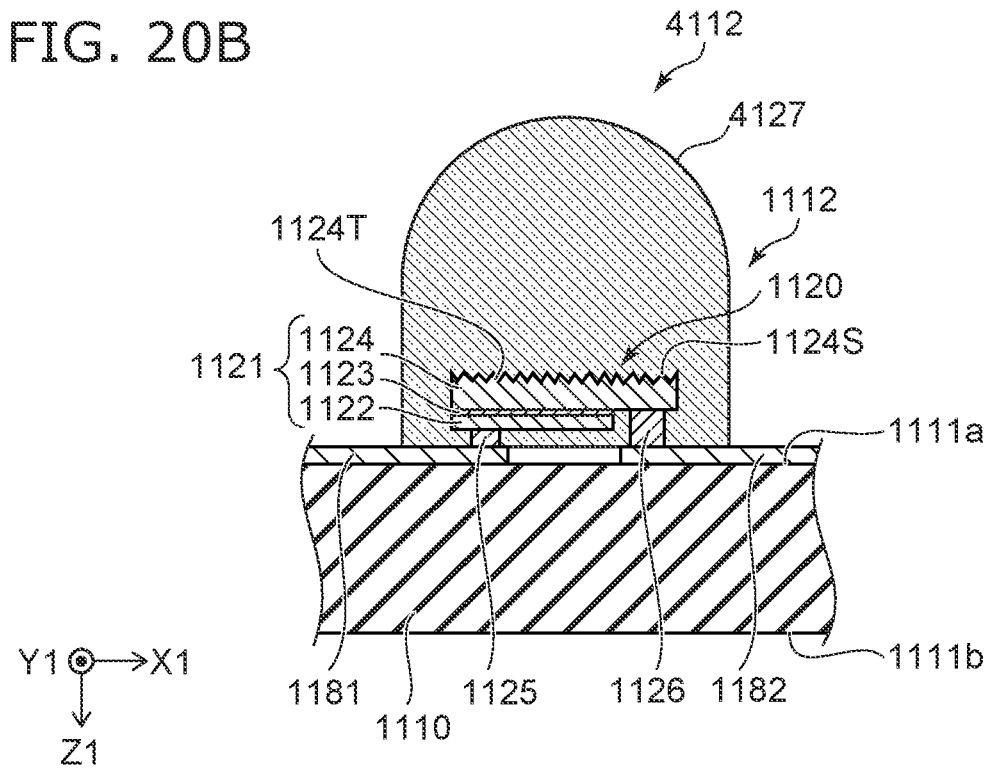
FIG. 20B is a schematic auxiliary cross-sectional view along line XXB-XXB of FIG. 20A.

FIG. 20B is a schematic auxiliary cross-sectional view along line XXB-XXB of FIG. 20A.

The image display device according to the embodiment includes a display device 4100 instead of the display device 1100(S) of the image display devices according to the other embodiments described above. The other components of the image display device according to the present embodiment are the same as those of the image display devices according to other embodiments described above. In the image display device according to the present embodiment as shown in FIGS. 20A and 20B, the display device 4100 differs from the display device 1100(S) in that a pixel 4112 includes a microlens 4127. Other configurations of the display device 4100 are the same as those of the display device 1100(S); the same components are denoted with the same reference numerals, and a detailed description thereof is omitted as appropriate. The X1Y1Z1-coordinate system shown in FIG. 3A and other figures is used as the three-dimensional orthogonal coordinate system.

The display device 4100 includes the substrate 1110, the plurality of pixels 4112, the scanning circuit 1130, the plurality of scanning lines 1140, the plurality of lighting control lines 1150, the drive circuit 1160, and the plurality of signal lines 1170. The pixel 4112 includes the LED element 1120, the individual circuit 1180, and the microlens 4127. The LED element 1120 and the individual circuit 1180 are the same as those of the example described with reference to FIGS. 3A to 5; the same components are denoted with the same reference numerals, and a detailed description thereof may be omitted.

The microlens 4127 is located on the first surface 1111a of the substrate 1110 and covers the LED element 1120. The microlens 4127 also covers portions of the wiring parts 1181 and 1182 on the first surface 1111a.

The microlens 4127 is substantially circular when viewed in the X1Y1-plane. The microlens 4127 is not limited to circular, and may be elliptical or distorted circular. The microlens 4127 has a circular tubular shape at the first surface 1111a side and a hemispherical shape at its tip portion. That is, the microlens 4127 is convex in the negative direction of the Z1-axis. It is desirable for the convex vertex to be substantially above the emission center of the LED element 1120 in the Z1-axis. The microlens 4127 is formed of a light-transmitting material, and is formed of, for example, a light-transmitting resin. The desired light emission color can be obtained by the light-transmitting resin including a phosphor.

The microlens 4127 is procured or formed using well-known manufacturing technology. For example, the microlens 4127 is formed by resin potting. In the resin potting, a resin is potted to cover each of the plurality of LED elements 1120 located on the substrate 1110. The microlens 4127 is formed by curing the potted resin.

Effects of the image display device according to the embodiment will now be described.

The image display device according to the present embodiment has effects similar to those of the image display device 1000 according to the first embodiment. The image display device according to the embodiment also has the following effects.

In the image display device according to the embodiment, the display device 4100 includes the LED element 1120 that includes the microlens 4127. In the LED element 1120 as described with reference to FIG. 4A, the recess 1124T is formed by roughening the light-emitting surface 1124S, etc. Accordingly, the microlens 4127 renders light of a wide light distribution angle into a narrow distribution, allowing a pixel that has a sufficient size to emit light of a sufficient front luminance.

In the display device 4100 of the image display device according to the present embodiment, the LED element 1120 of the pixel 4112 is formed of a gallium nitride compound semiconductor and the microlens 4127 is employed, so that the display device 4100 having higher luminance with low power consumption can be realized. By realizing the high-luminance display device 4100, the image display device according to the present embodiment can display a clearer mid-air image.

Fifth Embodiment

Figure 21:
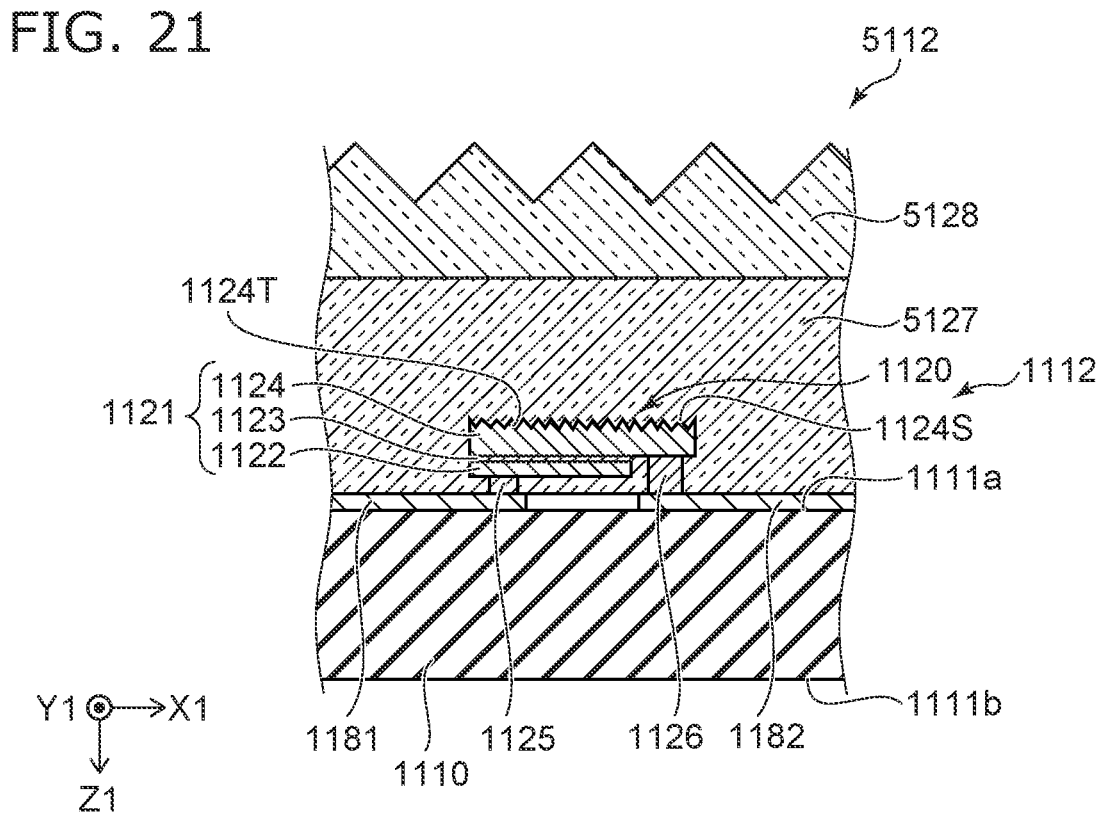
FIG. 21 is a schematic cross-sectional view illustrating a portion, i.e., a display device, of an image display device according to a fifth embodiment.

FIG. 21 is a schematic cross-sectional view illustrating a portion, i.e., a display device, of an image display device according to a fifth embodiment.

As shown in FIG. 21, the image display device according to the present embodiment includes a display device 5100 instead of the display devices 1100(S) and 4100 of the image display devices according to the other embodiments described above. The other components of the image display device according to the present embodiment are the same as those of the image display devices according to the other embodiments described above. The display device 5100 of the image display device according to the present embodiment differs from the display device 1100(S) shown in FIGS. 3A to 5 and the display device 4100 shown in FIG. 19 in that a pixel 5112 includes a prism sheet 5128. Other configurations of the display device 5100 are the same as those of the display device 1100(S); the same components are denoted with the same reference numerals, and a detailed description is omitted as appropriate. The X1Y1Z1-coordinate system shown in FIG. 3A and other figures is used as the three-dimensional orthogonal coordinate system.

The display device 5100 includes the pixels 5112. Similarly to the display device 1100(S) shown in FIG. 3B and the display device 4100 shown in FIG. 20A, a plurality of pixels 5112 are arranged in a matrix configuration. Similarly to the display device 1100(S) shown in FIG. 3A and other figures, the display device 5100 includes the substrate 1110, the scanning circuit 1130, the plurality of scanning lines 1140, the plurality of lighting control lines 1150, the drive circuit 1160, and the plurality of signal lines 1170.

The pixel 5112 includes the LED element 1120, a protective layer 5127, and the prism sheet 5128. Similarly to the display device 1100(S) shown in FIGS. 3B and 5, the pixel 5112 includes the individual circuit 1180. The LED element 1120 and the individual circuit 1180 are the same as those of the example described with reference to FIG. 3B and other figures, and a detailed description thereof will be omitted.

The protective layer 5127 covers the LED element 1120 and the wiring parts 1181 and 1182 on the first surface 1111a of the substrate 1110. The protective layer 5127 is a light-transmitting resin material. For example, the protective layer 5127 is provided on the substrate 1110 to cover the LED element 1120.

The prism sheet 5128 is located on the protective layer 5127. The prism sheet 5128 includes many grooves that are formed in the surface of a resin base member, have prismatic angles, and scatter the incident light. When using a prism sheet in which grooves are formed along one direction, for example, two prism sheets can be used in an arrangement in which formation directions of respective grooves are orthogonal to each other.

Effects of the image display device according to the embodiment will now be described.

The image display device according to the present embodiment has effects similar to those of the image display device 1000 according to the first embodiment. The image display device according to the embodiment also has the following effects.

In the image display device according to the present embodiment, the luminance of the prism sheet 5128 directly above the LED element 1120 of the pixel 5112, that is, at the negative Z1-axis side, can be increased because the pixel 5112 of the display device 5100 includes the prism sheet 5128. Therefore, the display device 5100 can output a clearer image with low power consumption. Accordingly, the image display device according to the present embodiment can display a clearer mid-air image with low power consumption.

Sixth Embodiment

Figure 22:
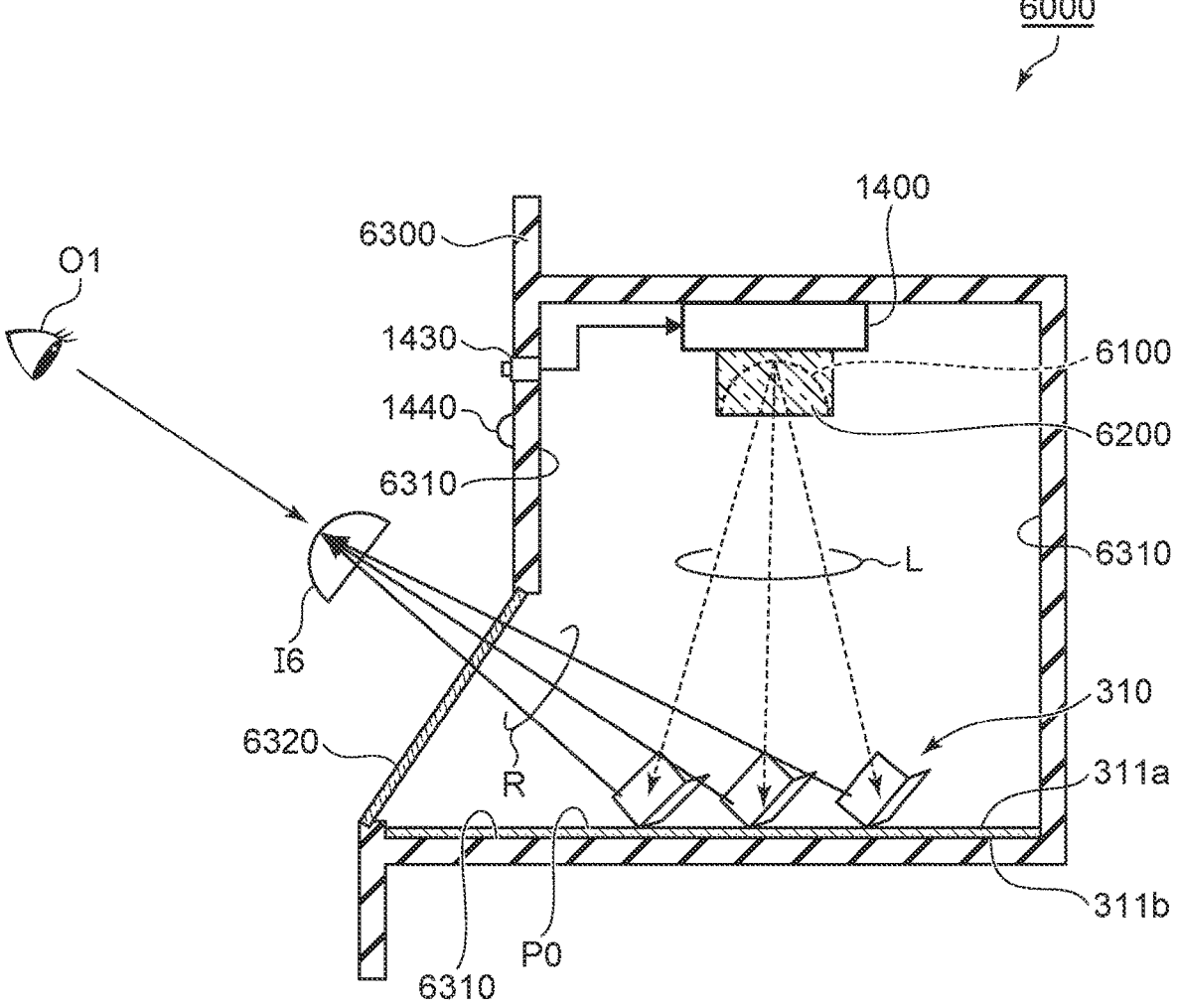
FIG. 22 is a schematic cross-sectional view illustrating an image display device according to a sixth embodiment.

FIG. 22 is a schematic cross-sectional view illustrating an image display device according to a sixth embodiment.

As shown in FIG. 22, the image display device 6000 according to the present embodiment includes the imaging element 310, a display device 6100, a light-transmitting member 6200, a housing 6300, and a light-transmitting member 6320.

The image display device 6000 according to the present embodiment includes the display device 6100 that is different from the display devices 1100(S), 4100, and 5100 of the image display devices according to other embodiments described above. The display device 6100 differs from the display devices 1100(S), 4100, and 5100 in that the pixels are formed on a hemispherical concave surface. In the display device 6100 of this example, the light-transmitting member 6200 is formed as a single continuous body with the display device 6100. The light-transmitting member 6200 functions as an optical system.

The imaging element 310 of the image display device 6000 differs from the imaging element 310a of other embodiments described above. As described with reference to FIGS. 12A and 12B, the imaging elements 10, 310, and 310a of any configuration can be provided as the imaging element according to the space inside the housing, the mounting location of the image display device, etc.

The relationship between the position of the display device 6100 and the position of the imaging element 310 in the image display device 6000 is different from those of other embodiments described above. In the image display device 6000, the display device 6100 is located directly above the imaging element 310. Therefore, the light L that is emitted from the display device 6100 travels downward and is irradiated on the imaging element 310. In the imaging element 310, a portion of the incident light is reflected twice at the dihedral orthogonal reflector, and thus the reflected light R exits the imaging element 310. The light-transmitting member 6320 is located at a position to transmit the reflected light R reflected twice by the imaging element 310.

The light that is reflected only once by the dihedral corner reflector of the imaging element 310 and the light that is not reflected by the dihedral corner reflector escape to the second surface 311b side through the spacing 23 of the adjacent reflector rows 22 shown in FIG. 6. Accordingly, light from the imaging element 310 other than the twice-reflected light does not travel to the first surface 311a side. Therefore, in the image display device 6000 according to the present embodiment, the display device 6100, which serves as a light source, is disposed at a position in the direction normal to the first surface 311a of the imaging element 310; therefore, the spacings 23 between adjacent reflector rows 22 is provided in the imaging element 310.

In the example, a light-shielding member 6310 is located at the bottom surface inside the housing 6300 so that the light escaping toward the second surface 311b is not re-reflected inside the housing 6300 to become stray light. The light-shielding member 6310 also is located at the sidewall surface inside the housing 6300. Similarly to the light-shielding member 1310 shown in FIG. 1, the light-shielding member 6310 is, for example, a coated film of a black coating formed on the bottom surface and wall surface inside the housing 6300. The light-shielding member 6310 is illustrated as an interior surface of the housing 6300 in FIG. 22 because the light-shielding member 6310 is sufficiently thin compared to the thickness of the components of the housing 6300.

In the image display device 6000 according to the present embodiment, only the twice-reflected light R of the incident light L exits the imaging element 310, and the imaging element 310 does not reflect the other light toward the first surface 311a side. Therefore, as described with reference to FIG. 14, the imaging element 310 allows for reducing the formation of a ghost image other than the real image at the first surface 311a side.

The configuration of the display device 6100 will now be described.

Figure 23A:
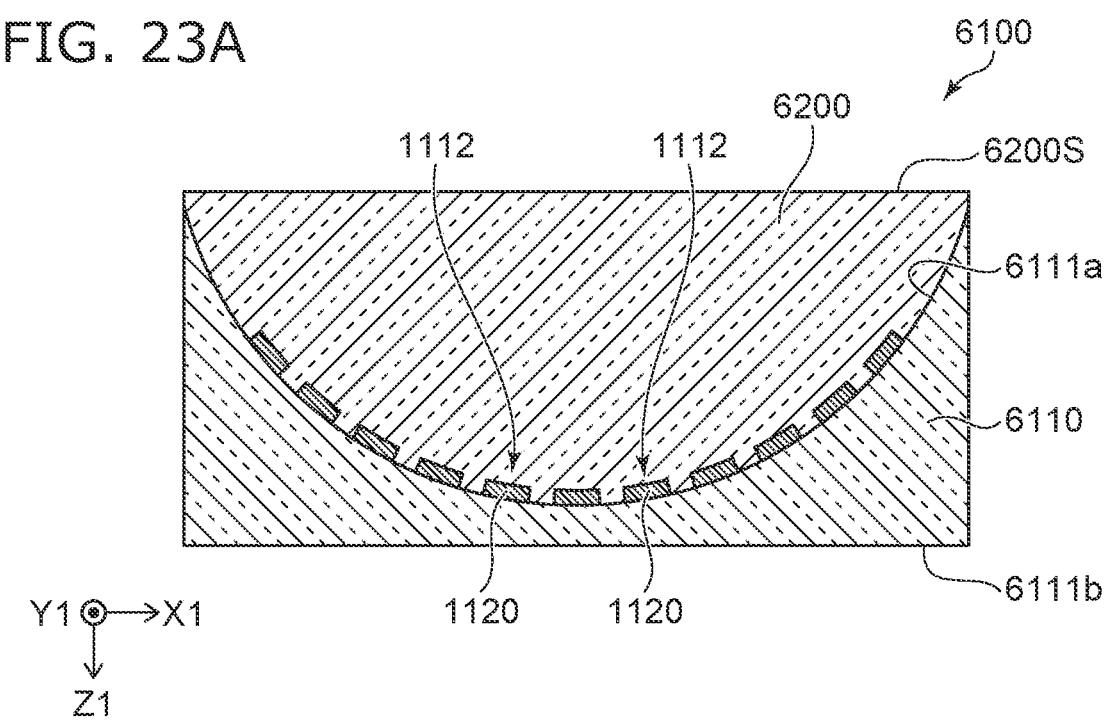
FIG. 23A is a schematic cross-sectional view illustrating a portion, i.e., a display device, of the image display device according to the sixth embodiment.

FIG. 23A is a schematic cross-sectional view illustrating a portion, i.e., the display device, of the image display device according to the sixth embodiment.

As shown in FIG. 23A, the display device 6100 includes a base member 6110 and the pixel 1112. As described with reference to FIGS. 3B to 5, the display device 6100 includes a scanning circuit, a drive circuit, various signal lines, etc. The pixel 1112 includes the LED element 1120. As described with reference to FIGS. 4A to 5, the pixel 1112 includes an individual circuit.

The base member 6110 includes a concave surface 6111a that is a portion of a spherical surface. The concave surface 6111a is located at the negative Z1-axis side. In the example, a surface 6111b at the side opposite to the concave surface 6111a is a flat surface parallel to the X1Y1-plane. The base member 6110 is formed of a resin or the like and is formed of, for example, a black resin to reduce stray light attributed to reflections from the LED elements 1120.

The LED elements 1120 are located on the concave surface 6111a. For example, the LED elements 1120 are arranged in a matrix configuration when viewed in the X1Y1-plane. The arrangement of the LED elements 1120 is not limited to a matrix configuration and may be a concentric circular configuration centered on the center of the outer circle of the concave surface 6111a.

The LED elements 1120 and the concave surface 6111a are covered with the light-transmitting member 6200. In the example, the base member 6110 and the light-transmitting member 6200 has a circular columnar shape.

The light-transmitting member 6200 protects the LED elements 1120 located on the concave surface 6111*a*. The light-transmitting member 6200 has a larger refractive index than air, and thus also functions as an optical system by. An emission surface 6200S of the light-transmitting member 6200 is a flat surface in the example, but is not limited thereto and may be a concave surface or convex surface.

In the image display device 6000 according to the present embodiment, a hemispherical three-dimensional image I6 can be formed in mid-air by causing the LED elements 1120 arranged on the hemispherical concave surface 6111*a* to emit light to form an image.

The arrangement of the pixels is not limited to a hemispherical concave surface; any curved three-dimensional image can be displayed in mid-air by arranging the pixels on any other curved surface.

Figure 23B:
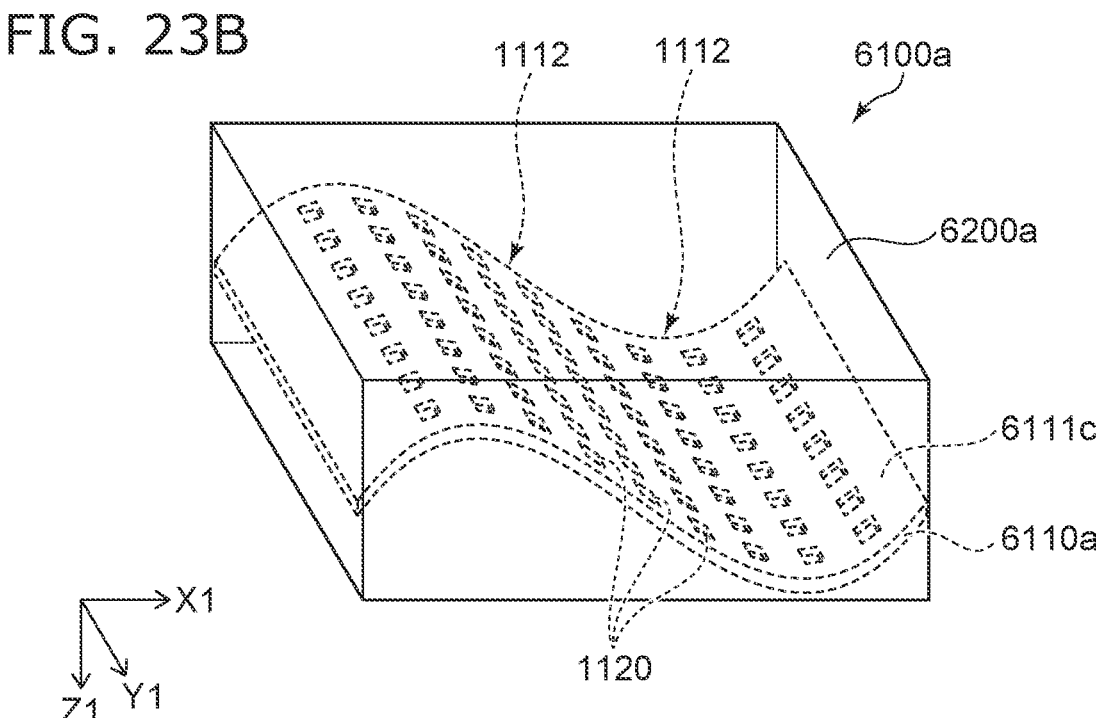
FIG. 23B is a schematic perspective view illustrating a portion, i.e., a modification of the display device, of the image display device according to the sixth embodiment.

FIG. 23B is a schematic perspective view illustrating a portion, i.e., a modification of the display device, of the image display device according to the sixth embodiment.

As shown in FIG. 23B, the display device 6100*a* includes a substrate 6110*a* and the plurality of pixels 1112. As described with reference to FIGS. 3B to 5, the display device 6100*a* includes a scanning circuit, a drive circuit, various signal lines, etc. The pixel 1112 includes the LED element 1120. As described with reference to FIGS. 4A to 5, the pixel 1112 includes an individual circuit.

The substrate 6110*a* includes a first surface 6111*c*. The first surface 6111*c* includes a region that is convex in the negative direction of the Z1-axis, and a region that is convex in the positive direction of the Z1-axis, and has a wavy shape when viewed in the X1Z1-plane.

The LED elements 1120 are arranged on the first surface 6111*c*, which is a wavy curved surface. For example, the LED elements 1120 are arranged in a matrix configuration when viewed in the X1Y1-plane.

The substrate 6110*a* at which the LED elements 1120 and the like are located is covered with a light-transmitting member 6200*a*. For example, the light-transmitting member 6200*a* is formed of a resin and is a transparent resin. The light-transmitting member 6200*a* protects the LED elements 1120 and the like by covering the substrate 6110*a* at which the LED elements 1120 and the like are located. The light-transmitting member 6200*a* has a larger refractive index than air, and thus also functions as an optical system by.

The image display device 6000 includes the display device 6100*a* instead of the display device 6100; therefore, a wavy three-dimensional image can be formed in mid-air.

Effects of the image display device 6000 according to the embodiment will now be described.

The image display device 6000 according to the embodiment has effects similar to those of the image display device 1000 according to the first embodiment. The image display device 6000 according to the embodiment also has the following effects.

In the image display device 6000 according to the embodiment, the LED elements 1120 of the display devices 6100 and 6100*a* are arranged on any curved surface. Therefore, the display devices 6100 and 6100*a* output the curved three-dimensional image that is set. The imaging element 310 forms an image in mid-air of the curved three-dimensional image as-is; therefore, the observer O1 can view, in mid-air, the three-dimensional image formed according to the curved surface that is set.

In the image display device 6000 according to the embodiment, the display device 1100(S) is located directly above the imaging element 310, that is, in the normal direction of the first surface 311*a*; the twice-reflected light of the imaging element 310 is emitted to form an image at the imaging element 310 side. Therefore, the display of a ghost image other than the real image can be prevented.

In the image display device according to the embodiment, the display device which is the light source may be provided to form a mid-air image directly above the imaging element as in the image display device 1000 shown in FIG. 1.

According to the other embodiments described above, the display of a ghost image may be prevented by providing the display device directly above the imaging element.

The embodiments described above can be combined as appropriate.

According to the embodiments described above, an image display device can be realized in which a simple structure can display an image in mid-air.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments herein may be made without departing from the spirit of the inventions. The accompanying claims and their equivalents are intended to cover such forms or modifications as would fall within the scope and spirit of the inventions. Also, the embodiments described above can be implemented in combination with each other.

What is claimed is:

1. An image display device comprising:
   an imaging element;
   a light source configured to irradiate light toward the imaging element;
   an optical system located in an optical path between the imaging element and the light source;
   a light-shielding member configured to shield a portion of light of at least the light source; and
   a light-transmitting member configured to transmit light emitted from the imaging element; wherein:
   the imaging element comprises either:
      a base member, and a reflector array provided on the base member, the base member including a first surface and a second surface positioned at a side opposite to the first surface, or
      a base member comprising a reflector array, the base member including a first surface and a second surface positioned at a side opposite to the first surface;
   the reflector array includes a plurality of reflector rows, the plurality of reflector rows including a plurality of dihedral corner reflectors arranged along a first direction;
   each of the plurality of dihedral corner reflectors includes:
      a first reflecting surface configured to reflect light from a first surface side, and
      a second reflecting surface orthogonal to the first reflecting surface and configured to reflect a reflected light from the first reflecting surface toward the first surface side;
   in each of the plurality of reflector rows, an angle between (i) a straight line at which the first reflecting surface and the second reflecting surface meet, and (ii) a plane in which the first direction and a second direction intersecting the first direction extend, is set to a value greater than 0° and less than 90°;
   an angle between the first reflecting surface and the plane is greater than 45° and less than 90°;

the plurality of reflector rows include a first reflector row in which the angle between the straight line and the plane is set to a smallest value among those of the plurality of reflector rows;

the reflector rows other than the first reflector row are configured such that the angle between the straight line and the plane is set to values that increase away from the first reflector row in the second direction;

the light source is located at the first surface side;

each of the plurality of dihedral corner reflectors is configured to cause a portion of once-reflected light to travel toward the second reflecting surface, the once-reflected light being light that is emitted from the light source and reflected at the first reflecting surface, the light-transmitting member is configured to transmit twice-reflected light, the twice-reflected light being a portion of the once-reflected light that is reflected at the second reflecting surface, the light-shielding member is configured to shield at least a portion of light other than the twice-reflected light.

2. The image display device according to claim 1, wherein:

the optical system comprises a plurality of optical elements.

3. The image display device according to claim 2, wherein the plurality of optical elements comprise a freeform mirror.

4. The image display device according to claim 1, further comprising:

a control mechanism configured to adjustably set optical axes of the light source and the optical system, and to adjustably set positions of the light source and the optical system in respective directions along the optical axes.

5. The image display device according to claim 1, wherein:

the light-shielding member is a portion of a housing provided around the light source and the imaging element, and the light-transmitting member is another portion of the housing.

6. The image display device according to claim 1, further comprising:

a housing located around the light source and the imaging element; wherein:

the light-transmitting member is located at a portion of the housing; and the light-shielding member is located between the light source and the light-transmitting member.

7. The image display device according to claim 1, wherein:

the light source is a display device comprising:

a substrate, and a plurality of semiconductor light-emitting elements located on the substrate.

8. The image display device according to claim 7, wherein:

the display device comprises lenses, each located at a respective one of the plurality of semiconductor elements.

9. The image display device according to claim 7, wherein:

the display device comprises a light-scattering member located on the plurality of semiconductor light-emitting elements.

10. The image display device according to claim 7, wherein:

the substrate includes a concave surface that is concave toward an emission direction of light; and the plurality of semiconductor light-emitting elements are located on the concave surface.

11. The image display device according to claim 7, wherein:

the substrate is flexible.

12. An image display device comprising:

an imaging element;

a light source configured to irradiate light toward the imaging element;

an optical system located in an optical path between the imaging element and the light source;

a light-shielding member configured to shield a portion of light of at least the light source; and a light-transmitting member configured to transmit light emitted from the imaging element; wherein:

the imaging element comprises either:

a base member and a reflector array provided on the base member, the base member including a first surface and a second surface positioned at a side opposite to the first surface, or a base member comprising a reflector array provided in a base member, the base member including a first surface and a second surface positioned at a side opposite to the first surface;

the reflector array includes a plurality of reflector rows, the plurality of reflector rows including a plurality of dihedral corner reflectors arranged along a first direction;

the plurality of reflector rows are arranged in a second direction to be parallel to each other with a spacing therebetween, the second direction intersecting the first direction;

each of the plurality of dihedral corner reflectors includes:

a first reflecting surface configured to reflect light from a first surface side, and a second reflecting surface orthogonal to the first reflecting surface and configured to reflect a reflected light reflected from the first reflecting surface toward the first surface side;

in each of the plurality of reflector rows, an angle between (i) a straight line at which the first reflecting surface and the second reflecting surface meet, and (ii) a plane in which the first direction and the second direction intersect, is set to a value greater than 0° and less than 90°;

an angle between the first reflecting surface and the plane is greater than 45° and less than 90°;

the plurality of reflector rows include a first reflector row in which the angle between the straight line and the plane is set to a smallest value among those of the plurality of reflector rows;

the reflector rows other than the first reflector row are configured such that the angle between the straight line and the plane is set to values that increase away from the first reflector row in one direction along the second direction;

the light source is located at the first surface side;

each of the plurality of dihedral corner reflectors is configured such that a first portion of once-reflected light travels toward the second reflecting surface, and a second portion of the once-reflected light travels toward a second surface side, the once-reflected light being light that is emitted from the light source and reflected at the first reflecting surface;

the light-transmitting member is configured to transmit twice-reflected light, the twice-reflected light being a portion of the once-reflected light that is reflected at the second reflecting surface; and the light-shielding member is configured to shield at least a portion of light other than the twice-reflected light.

13. The image display device according to claim 12, wherein:

the optical system comprises a plurality of optical elements.

14. The image display device according to claim 13, wherein:

the plurality of optical elements comprise a freeform mirror.

15. The image display device according to claim 12, further comprising:

a control mechanism configured to adjustably set optical axes of the light source and the optical system, and to adjustably set positions of the light source and the optical system in respective directions along the optical axes.

16. The image display device according to claim 12, wherein:

the light-shielding member is a portion of a housing provided around the light source and the imaging element, and the light-transmitting member is another portion of the housing.

17. The image display device according to claim 12, further comprising:

a housing located around the light source and the imaging element; wherein:

the light-transmitting member is located at a portion of the housing; and the light-shielding member is located between the light source and the light-transmitting member.

18. The image display device according to claim 12, wherein:

the light source is a display device including:

a substrate, and a plurality of semiconductor light-emitting elements located on the substrate.

19. The image display device according to claim 18, wherein:

the display device comprises lenses, each located at a respective one of the plurality of semiconductor elements.

20. The image display device according to claim 18, wherein:

the display device comprises a light-scattering member located on the plurality of semiconductor light-emitting elements.

21. The image display device according to claim 18, wherein:

the substrate includes a concave surface that is concave toward an emission direction of light; and the plurality of semiconductor light-emitting elements are located on the concave surface.

22. The image display device according to claim 18, wherein:

the substrate is flexible.

* * * * *